United States Patent [19]

Munteanu et al.

[11] Patent Number: 4,548,764

[45] Date of Patent: Oct. 22, 1985

[54] INSECT REPELLENT, PHEREMONAL, ANIMAL REPELLENT, DIAGNOSTIC OR AROMA ENCHANCING COMPOSITIONS CONTAINING POLY (EPSILON CAPROLACTONE) HAVING EMBEDDED THEREIN FUNCTIONAL SUBSTANCES

[75] Inventors: Marina A. Munteanu, New York, N.Y.; Edward S. Oltarzewski, Mercerville, N.J.; Leon Shechter, Summit, N.J.; Craig B. Warren, Rumson, N.J.

[73] Assignee: International Flavors & Fragrances Inc., New York, N.Y.

[21] Appl. No.: 636,227

[22] Filed: Jul. 31, 1984

Related U.S. Application Data

[62] Division of Ser. No. 563,771, Dec. 21, 1983, Pat. No. 4,496,467, which is a division of Ser. No. 468,997, Feb. 23, 1983, Pat. No. 4,469,613.

[51] Int. Cl.$^4$ .................... B01D 47/04; C11D 3/48; C11D 3/50

[52] U.S. Cl. .................... 261/75; 261/1; 424/2; 424/9; 424/19; 424/22; 424/30; 424/31; 424/76; 424/84; 424/DIG. 8; 424/DIG. 10; 239/57; 252/350

[58] Field of Search .................... 424/9, 21, 30, 31, 32, 424/33, 23, 24, 76, 78, 84, DIG. 8, DIG. 10, 2, 22, 19; 239/34, 43, 57; 525/190; 252/305, 350; 261/1, 75

[56] References Cited

U.S. PATENT DOCUMENTS

| | | | |
|---|---|---|---|
| 1,583,303 | 5/1928 | Mertz | 261/53 |
| 2,734,769 | 2/1956 | Holz | 239/57 |
| 2,967,128 | 1/1961 | Kare | 167/16 |
| 3,446,893 | 5/1969 | Hanford et al. | 252/350 |
| 3,474,176 | 10/1969 | Freeman | 424/331 |
| 3,505,432 | 4/1970 | Neuwald | 260/93.7 |
| 3,699,232 | 10/1972 | Gier et al. | 424/331 |
| 3,768,234 | 10/1973 | Hardison | 55/223 |
| 3,929,937 | 12/1975 | Clendinning et al. | 525/190 |
| 3,975,350 | 8/1976 | Hudgin et al. | 260/30.4 N |
| 3,992,336 | 11/1976 | Faucher et al. | 260/17 R |
| 4,018,729 | 4/1977 | Faucher et al. | 260/17 R |
| 4,023,942 | 5/1977 | Brady et al. | 55/210 |
| 4,043,772 | 8/1977 | Lundy | 55/220 |
| 4,080,318 | 3/1978 | Smith et al. | 260/77.5 |
| 4,136,067 | 5/1979 | Gould | 528/73 |
| 4,137,279 | 1/1979 | Smith et al. | 260/861 |
| 4,156,067 | 5/1979 | Gould | 528/73 |
| 4,165,293 | 8/1979 | Gordon | 252/118 |
| 4,181,632 | 1/1980 | Schebece | 252/542 |
| 4,255,550 | 3/1981 | Gould | 528/44 |
| 4,306,552 | 12/1981 | Gregory | 128/155 |
| 4,326,010 | 4/1982 | Bauer | 428/483 |
| 4,360,682 | 11/1982 | Klenk et al. | 549/266 |
| 4,363,611 | 12/1982 | Austen et al. | 425/97 |
| 4,379,914 | 4/1983 | Lundberg | 528/354 |
| 4,379,915 | 4/1983 | Watanabe et al. | 528/357 |

FOREIGN PATENT DOCUMENTS

| | | |
|---|---|---|
| 1134992 | 11/1982 | Canada . |
| 3846 | 10/1982 | European Pat. Off. . |
| 137351 | 8/1982 | Japan . |
| 1589201 | 5/1981 | United Kingdom . |

OTHER PUBLICATIONS

Aliphatic Polyesters, III, Molecular Weight and Molecular Weight Distribution in Alcohol-Initiated Polymerization of Caprolactone, Chemical Abstract, 96: 123625x.

Synthins and Properties of Elastomers Made of Poly(-Caprolactone) and Polyhydroxypropylene Glycol, Chemical Abstract, 96: 182505g.

Additive in a Photopolymerizable Composition for Reducing its Adhesion to a Support Film, Chemical Abstract, 96: 225395c.

Polycaprolactone Resins, Chemical Abstract, 96: 69984y.

Controlled Release Technologies: Methods, Theory, and Applications, A. F. Kydonieus, Hercon Group, Health-Chem. Corp., New York, N.Y.

New Polycaprolactones Thermoplastic Polymers PCL-300 and PCL-700, Union Carbide Corp., Chemical and Plastics, 270 Park Avenue, New York, N.Y. 10017.

Studies of Polyester/Chlorinated Poly(Vinylchloride), Chemical Abstract, 97: 145570g.

(Other Publications and Abstract continued on next page.)

Caprolactone-a Specialty Chemical for the 1980s, Chemical Abstract, 97: 110411v.
Modification of Acrylic Polymers for High Solids Coatings, Chemical Abstract, 97: 199589e.
Small-Angle X-Ray and Neutron Scattering Studies of Amorphous Polymer Blends, Chemical Abstract, 97: 183220s.
Fungal Degradation of Polycaprolactones, Chemical Abstract, 98: 72856e.
Biodegradable Polymers for Sustained Drug Delivery, Schindler et al, Research Triangle Institute, P.O. Box 12194, Research Triangle Park, N.C. 27709.

*Primary Examiner*—Paul Lieberman
*Assistant Examiner*—Hoa Van Le
*Attorney, Agent, or Firm*—Arthur L. Liberman

[57] ABSTRACT

Described is the use of homopolymers of (epsilon caprolactone) defined according to the structure:

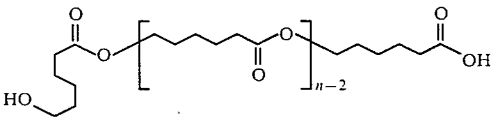

and, optionally,

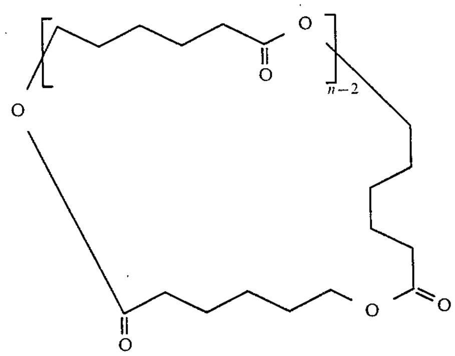

as controlled release materials for physiological or psychological diagnostic compositions, pheremones, insect repellent compositions, animal repellent compositions, and/or aroma augmenting or enhancing media for use in perfume compositions or perfumed articles or colognes; wherein n represents an integer of from about 500 up to about 1,200 with the proviso that the average "n" varies from about 600 up to about 800. Also described are mixtures of such homopolymers with other polymers such as polyethylene, polypropylene, mixtures of polyethylene and polyvinyl acetate, copolymers of ethylene and vinyl acetate, and the like, useful for controlled release of such physiological or psychological diagnostic compositions, pheremones, insect repellents, animal repellents and perfume materials into a gaseous environment surrounding the polymer matrix. Also described are methods for blending such polycaprolactone homopolymers whereby a first amount of a liquified polycaprolactone is admixed in an extruder, for example, with a diagnostic material and/or scent imparting material and/or an animal repellent material and/or insect repellent material and/or a pheremone material. The solidified pellets may if desired, then be mixed in, for example, a second extruder with a second amount of unscented polycaprolactone or other polymer, e.g., polyolefin, the second amount of polymer being the same or somewhat larger then the first amount. The mixture thus obtained may again be solidified and, if desired, repelletized. The resulting pellets may, if desired, be formed into functional articles by means of, for example, injection molding.

6 Claims, 37 Drawing Figures

FIG. 2
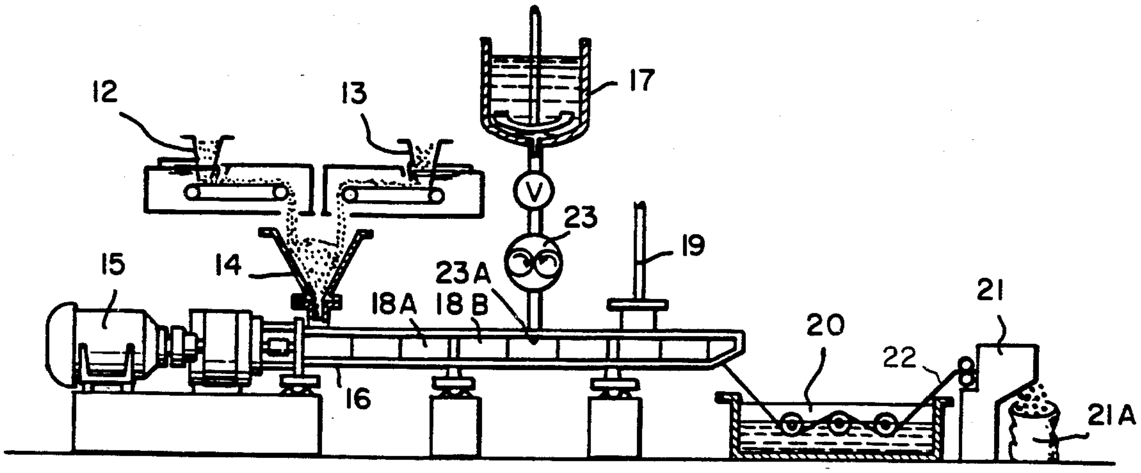
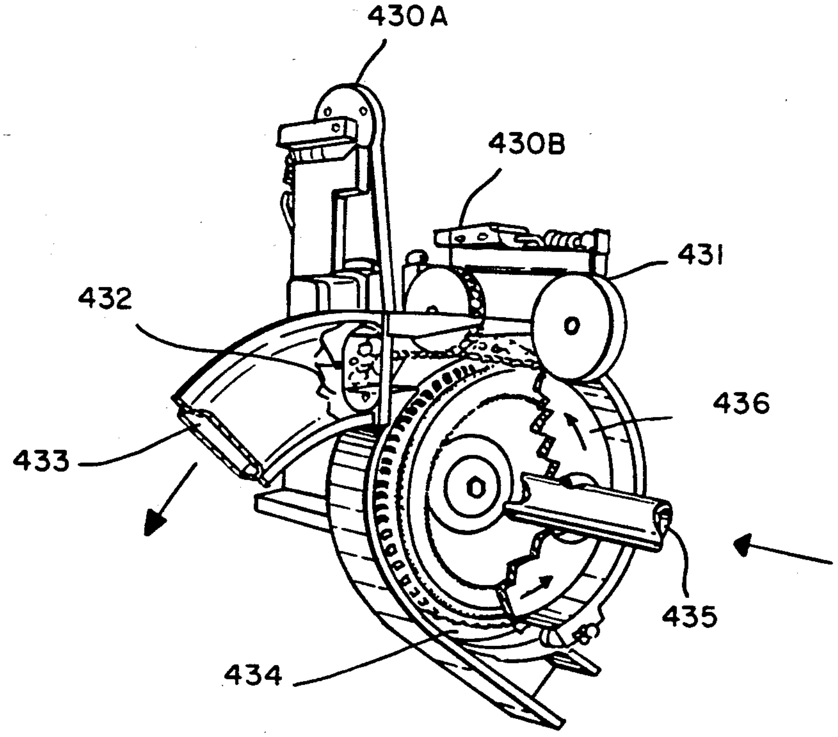
FIG. 3

FIG. 4
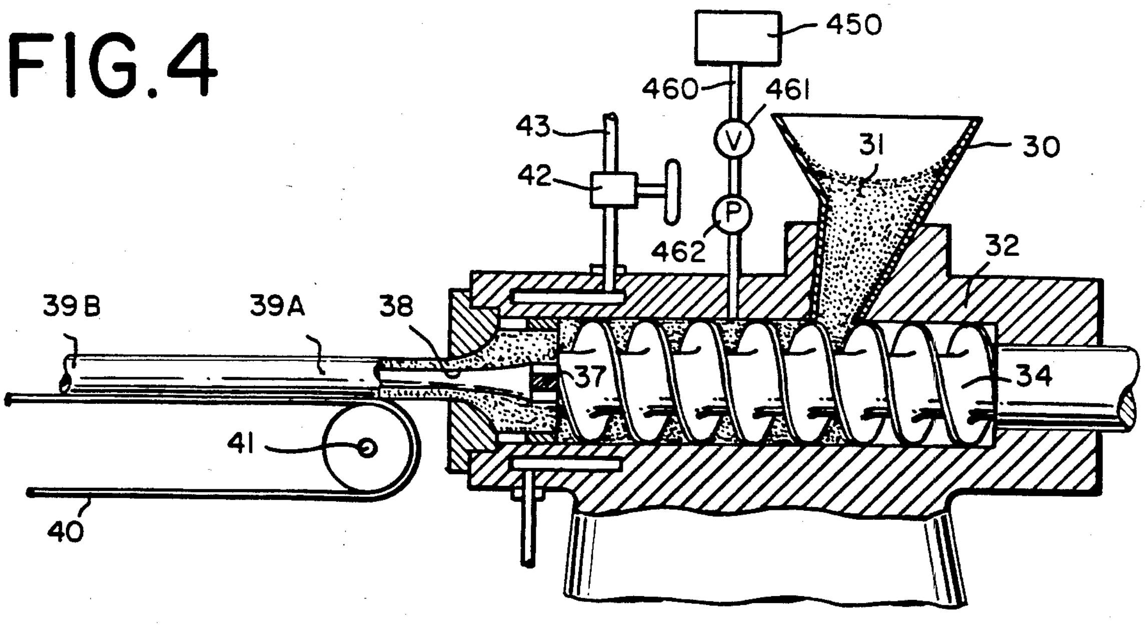
FIG. 5A
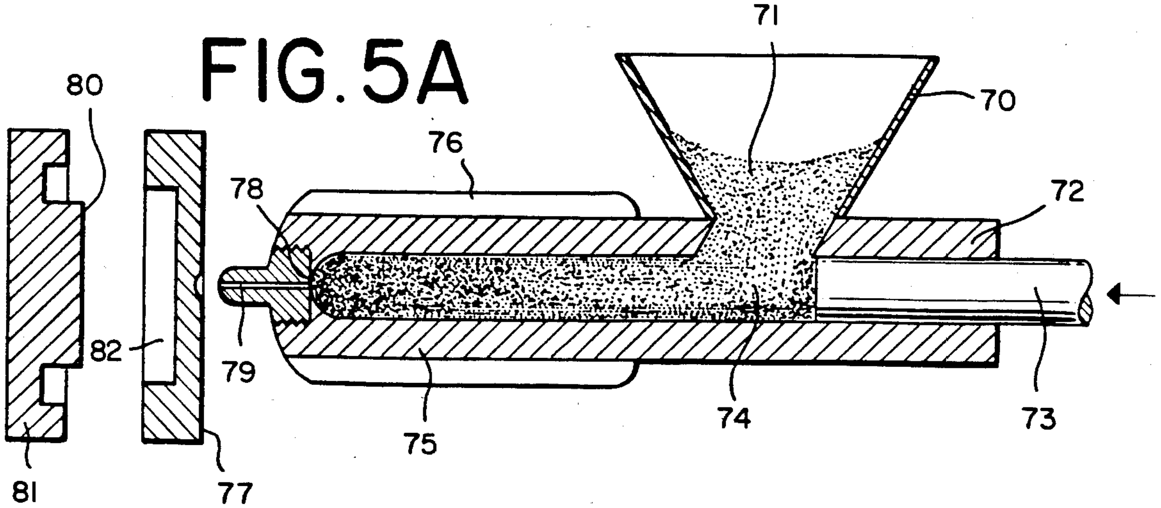
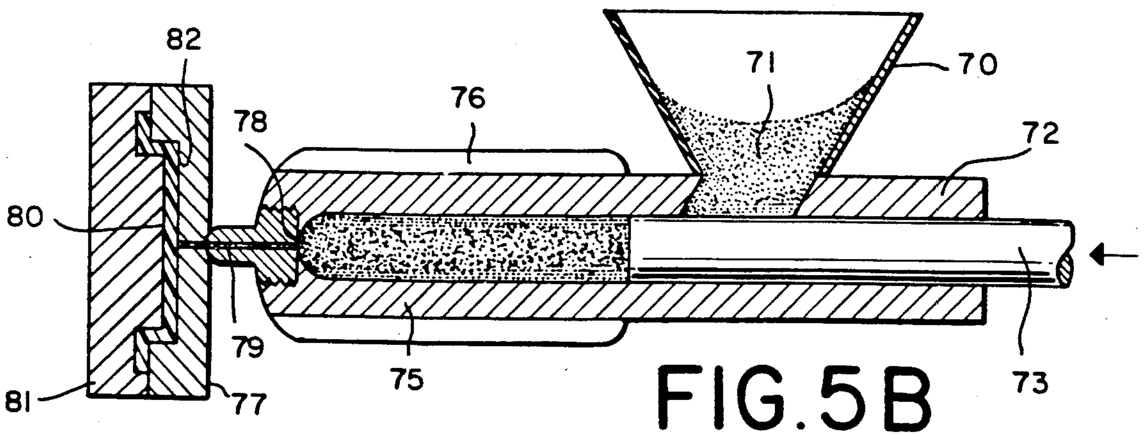
FIG. 5B

FIG.8
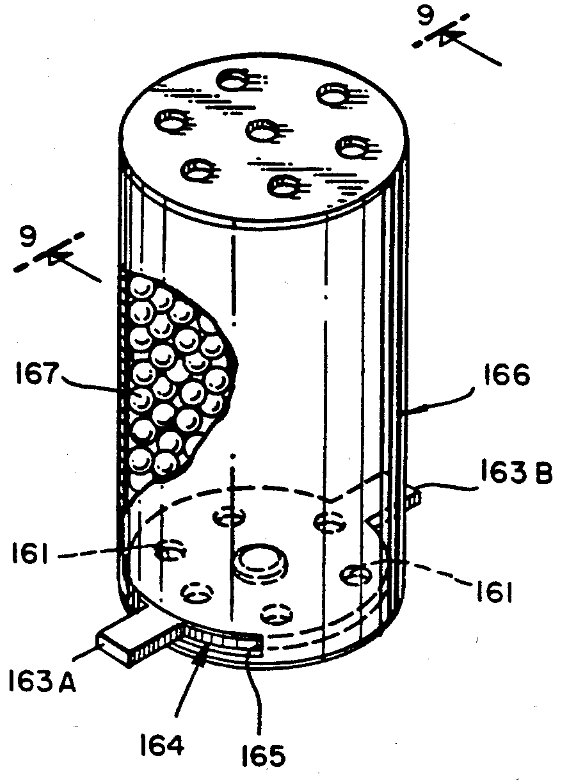
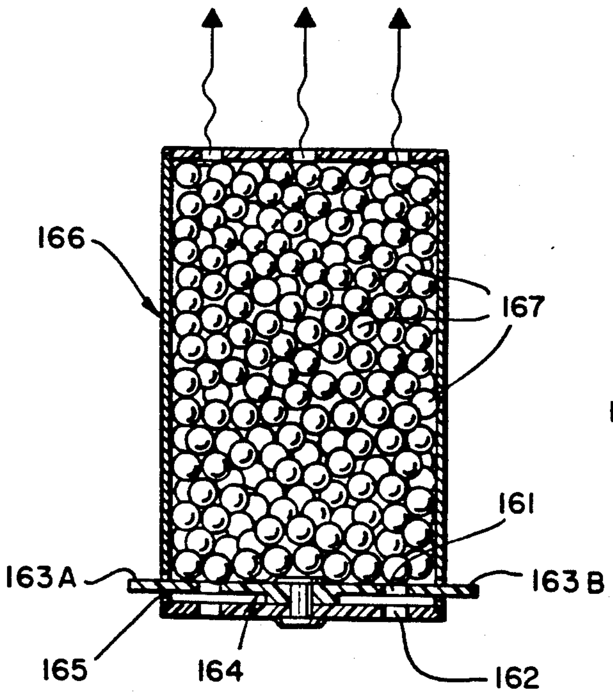
FIG.9
FIG.10
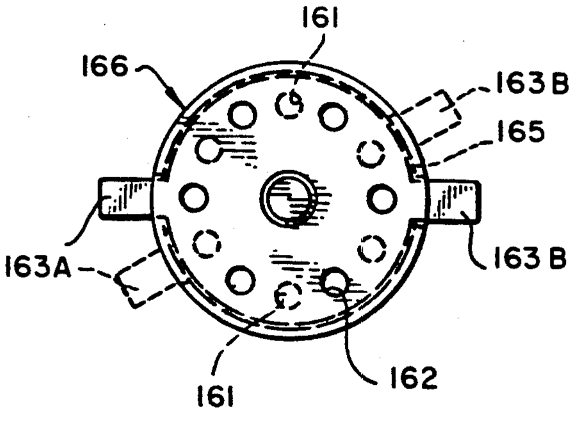

FIG.16
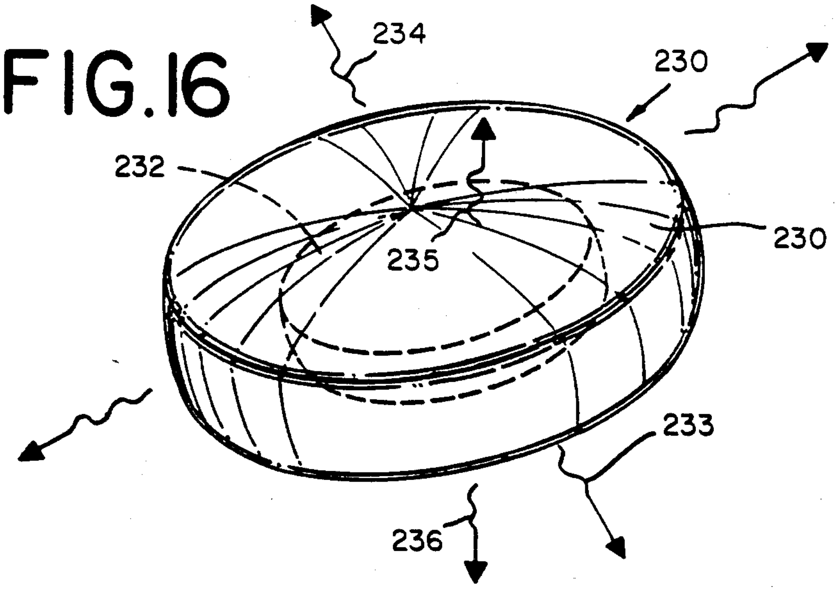
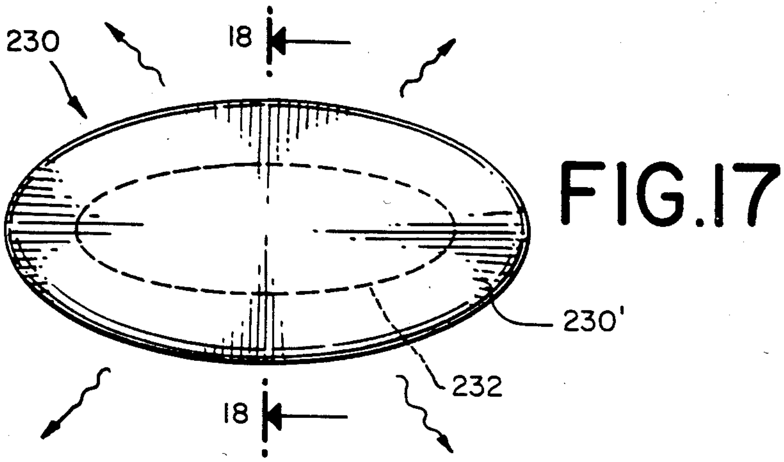
FIG.17
FIG.18
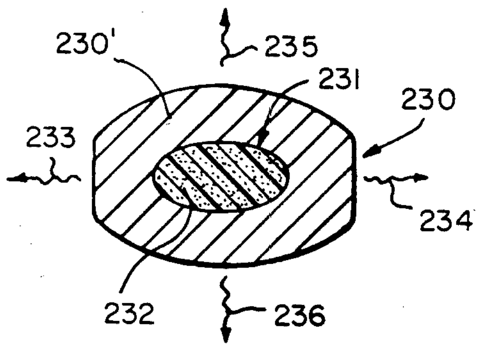
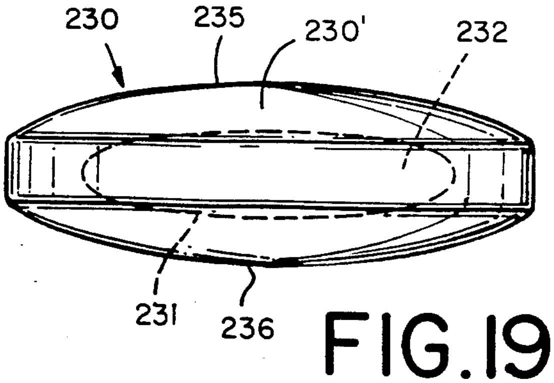
FIG.19

FIG.20
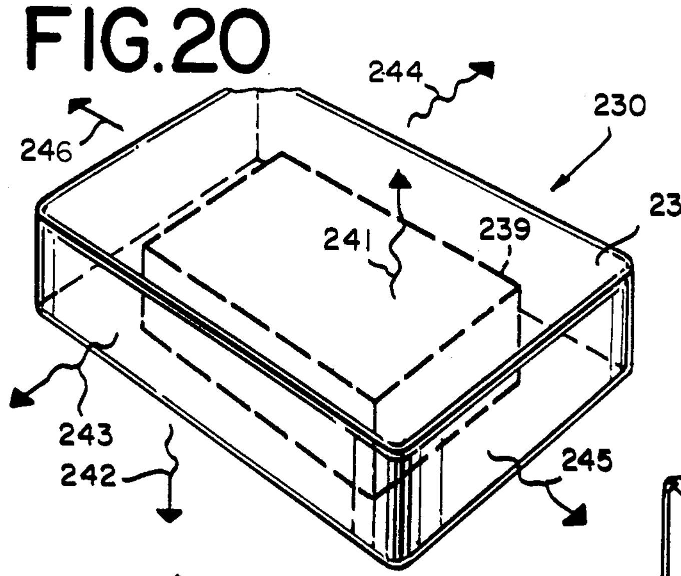
FIG.21
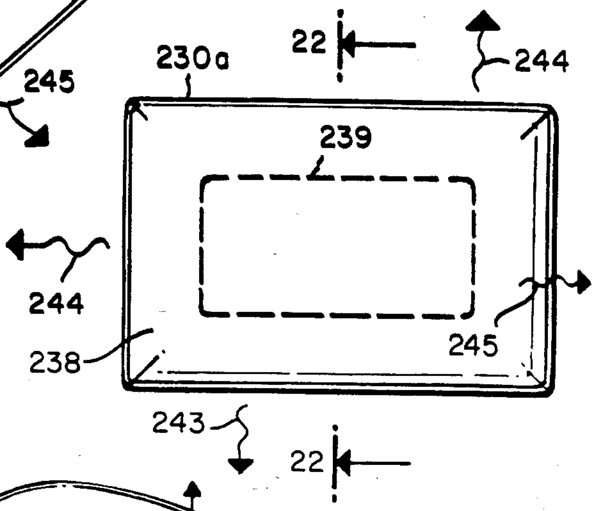
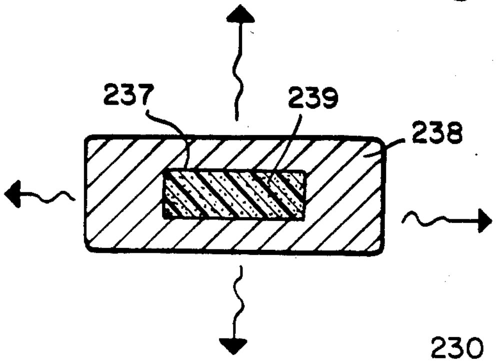
FIG.22
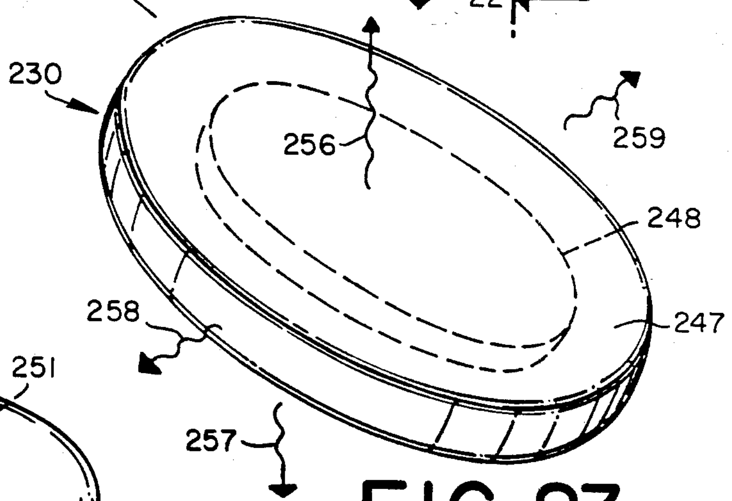
FIG.23
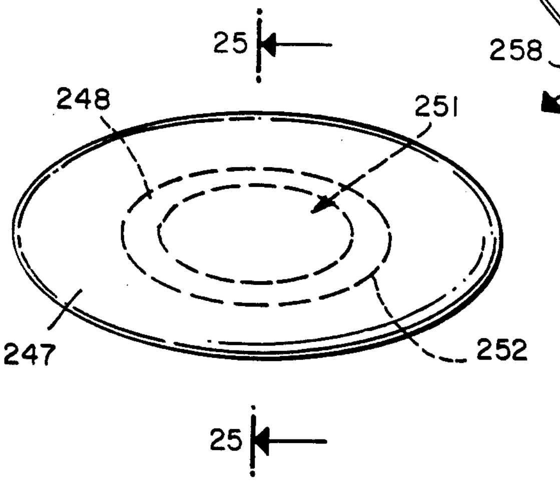
FIG.24
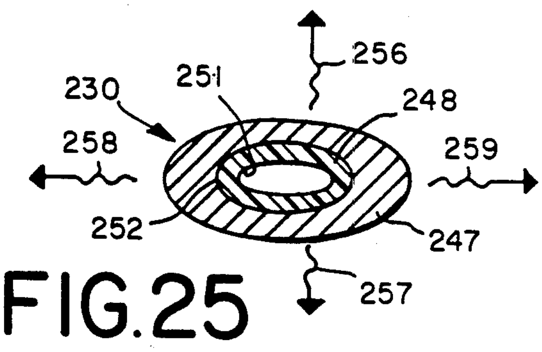
FIG.25

FIG.26
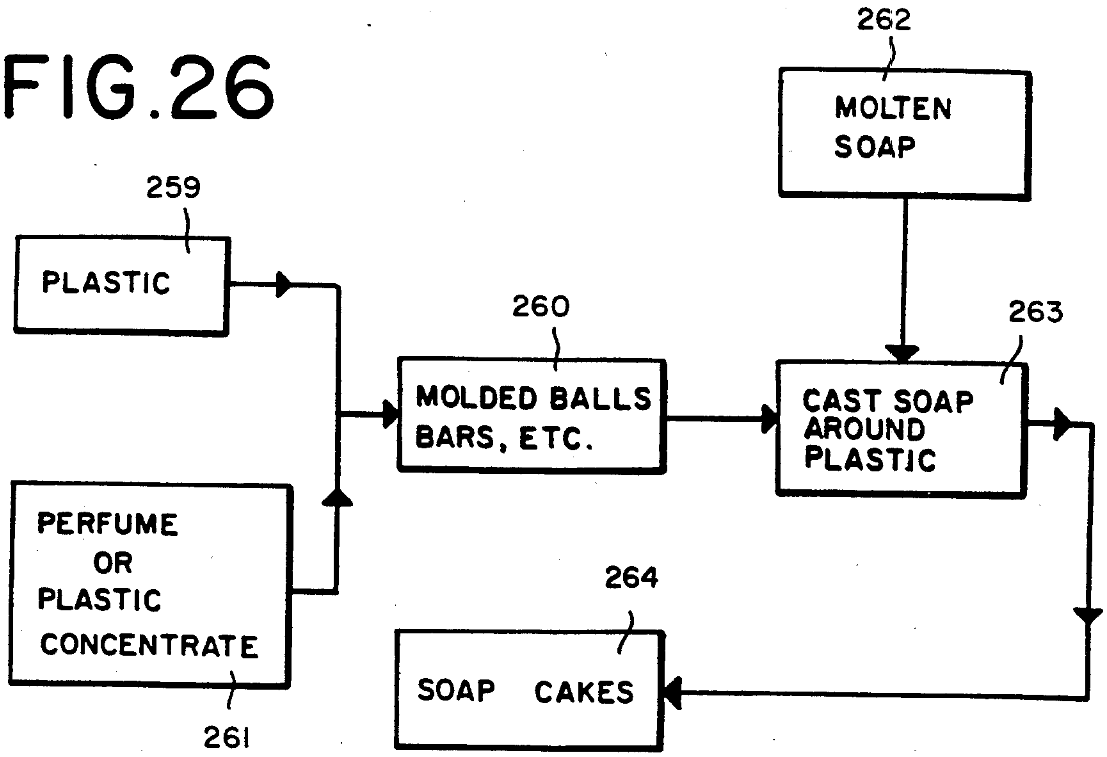
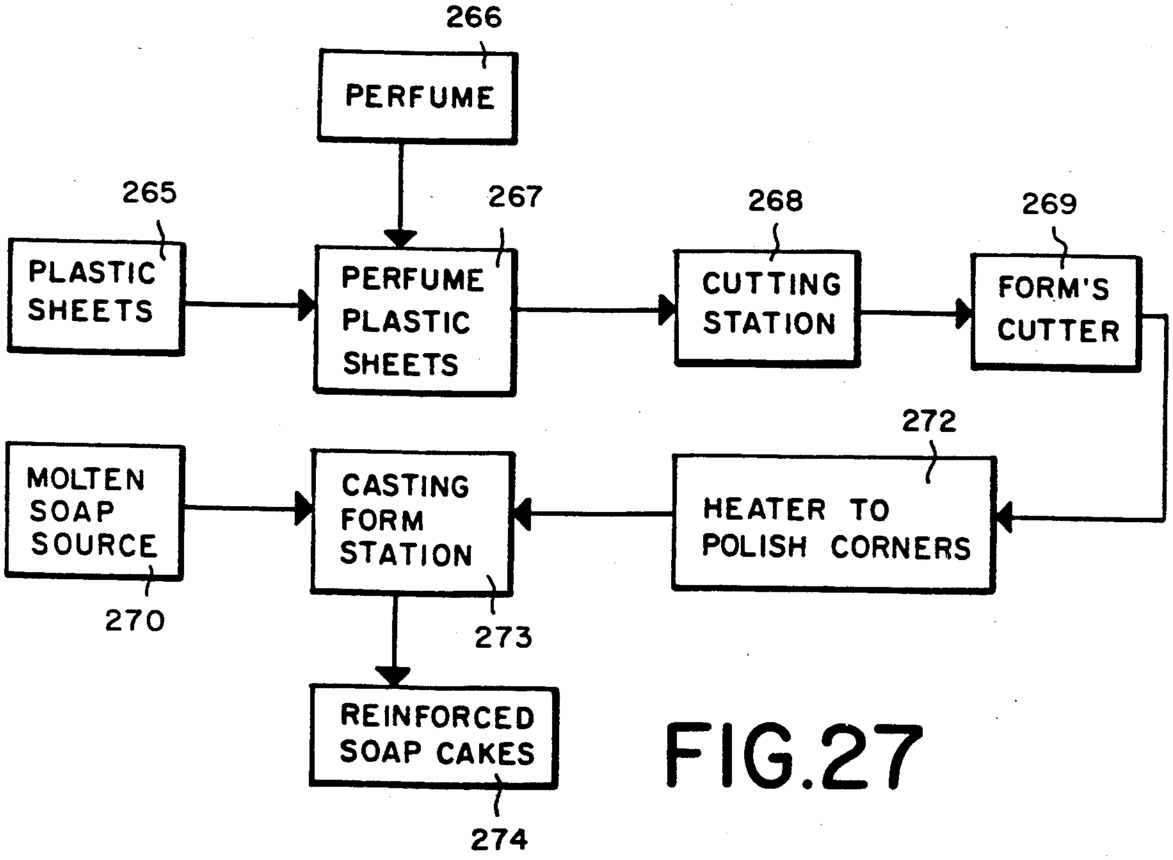
FIG.27

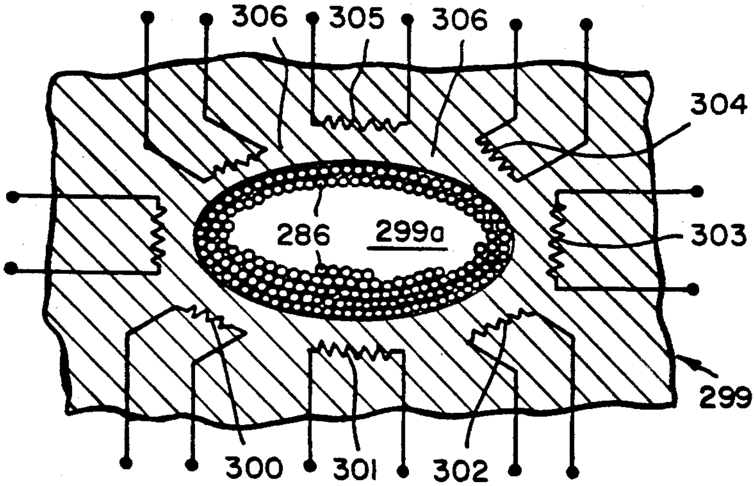
FIG.28
FIG.29
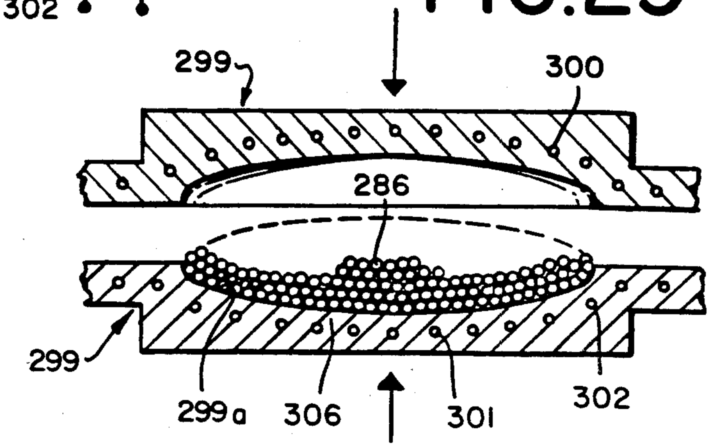
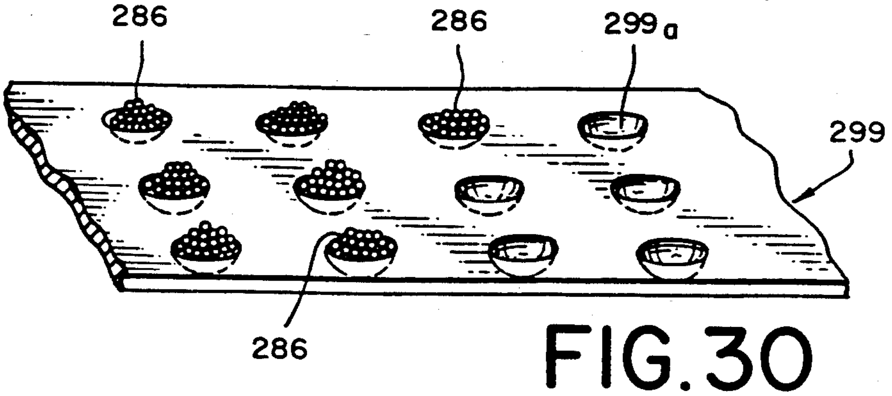
FIG.30
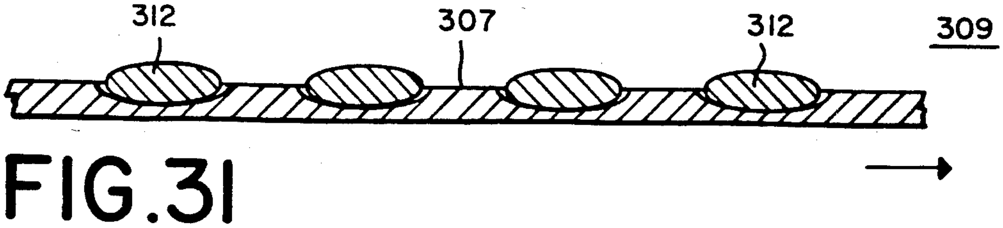
FIG.31

INSECT REPELLENT, PHEREMONAL, ANIMAL REPELLENT, DIAGNOSTIC OR AROMA ENHANCING COMPOSITIONS CONTAINING POLY(EPSILON CAPROLACTONE) HAVING EMBEDDED THEREIN FUNCTIONAL SUBSTANCES.

This is a divisional of application Ser. No. 563,771, filed Dec. 21, 1983, now U.S. Pat. No. 4,496,467, which, in turn, is a divisional of application for U.S. Letters Patent Ser. No. 468,997, filed on Feb. 23, 1983, now U.S. Pat. No. 4,469,613.

BACKGROUND OF THE INVENTION

This invention relates to the use of poly(epsilon caprolactone)homopolymers taken alone or taken in admixture with other polymers for use as controlled release devices for controlled release of diagnostic materials and/or insect repellents and/or animal repellents and/or aroma augmenting or enhancing compositions and/or pheremones, which polycaprolactones are defined according to the structure:

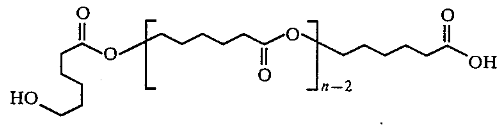

and, optionally,

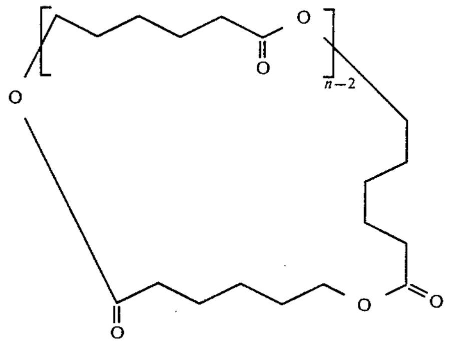

wherein n varies from about 500 up to about 1,200 with the proviso that the average "n" varies from about 600 up to about 800.

The use of polycaprolactones in controlled release situations is known in the prior art. Poly(epsilon caprolactone) as well as copolymers of epsilon decalactone and epsilon caprolactone are disclosed for their utilities as biodegradable polymers for sustained drug delivery in "Contemporary Topics In Polymer Science", Vol. 2, Pearce, et al, Plenum Press, New York, 1977, at page 271. The system for controlled release of drugs into an aqueous system, e.g., in vivo in mammalian species is different *in kind* from a system whereby there occurs a controlled release of diagnostic compositions or perfume compositions or perfume materials and/or animal repellents and/or insect repellents and/or pheremones from such polycaprolactones or mixtures of polycaprolactones with other polymers into a gaseous environment, e.g., the atmosphere surrounding such polymer systems.

An ever increasing requirement in the medical diagnosis field and in the perfume, animal repellent and insect repellent industries exists for a slow controlled release device for slowly and controllably releasing diagnostic compositions for diagnosing physiological malfunctions or aberrations in mammalian species, animal repellents and/or insect repellents and/or perfume materials and/or pheremones into a gaseous environment in order to aid in the diagnosis of such malfunctions or aberrations and/or to aesthetically scent the said environment and/or in order to repel insects and/or in order to repel mammalian species, e.g., deer, coyote, dogs and the like.

Slow release polymers containing perfumes are well known in the prior art. Thus, United Kingdom patent specification No. 1,589,201 (the specification for which is incorporated by reference herein) assigned to Hercules Inc. discloses a thermoplastic resin body consisting of a thermoplastic copolymer of ethylene and 6–60 weight percent of a polar vinyl monomer selected from the group consisting of vinyl acetate, methyl acrylate, ethyl acrylate, butyl acrylate and acrylic acid wherein the perfumed resin body is suitable for the preparation of shaped objects from which perfume odor emanates over a prolonged period at a stable level.

U.s. Pat. No. 3,505,432 (the specification for which is incorporated by reference herein) discloses a method of scenting a polyolefin which comprises:

(a) mixing a first amount of liquid polyolefin, e.g., polyethylene or polypropylene with a relatively large amount of scent-imparting material to form a flowable mass;

(b) forming drops from said mass and causing substantially instantaneous solidification of said drops into polyolefin pellets having a relatively large amount of scent-imparting material imprisoned therein;

(c) melting said pellets with a second amount of said polyolefin, said second amount being larger than said first amount; and (d) solidifying the melt of (c).

The method of adding functional fluids to poly(epsilon caprolactone) homopolymers or mixtures of poly(epsilon caprolactone) homopolymers and other polymers is different in kind from the techniques disclosed in U.S. Pat. No. 3,505,432 in view of the physical properties of the poly(epsilon caprolactone) homopolymers. Thus, the use of an extruder, a jet molding apparatus or the like is a much more practical way of producing a mixture of the functional fluid and poly(epsilon caprolactone) homopolymer than the method of U.S. Pat. No. 3,505,432.

U.S. Pat. No. 4,247,498 issued on Jan. 27, 1981 (the specification for which is incorporated by reference herein) discloses microporous polymers which are capable of containing volatile substances such as perfumes and the like in forms ranging from films to blocks in intricate shapes from synthetic thermoplastic polymers such as olefinic, condensation polymers. In one embodiment of U.S. Pat. No. 4,247,498 the microporous polymers are characterized by relatively homogenous three-dimensional cellular structures having cells connected by pores of smaller dimension. Also disclosed in U.s. Pat. No. 4,247,498 is a process for making microporous polymers from such thermoplastic polymers by heating a mixture of the polymer and a compatible liquid (e.g., a perfume substance or the like) to form a homogeneous solution, cooling said solution under non-equilibrium thermodynamic conditions to initiate liquid-liquid phase separation, and continuing said cooling until the mixture achieves substantial handling strength. Also disclosed in said U.S. Pat. No. 4,247,498 are microporous polymer products which contain relatively large amounts of such functionally useful fluids as perfume compositions and behave as solids. U.S. Pat. No. 4,247,498 however, does not disclose the unexpected and unobvious advantages of polycaprolactone homopolymers or mixtures of such polycaprolactone homopolymers and other polymers such as polyethylene, polypropylene and copolymers of polyethylene and polyvinyl acetate when admixed with materials which are controllably releasable therefrom including diagnostic compositions or aroma augmenting or enhancing materials such as perfume compositions, animal repellents and pheremones and insect repellent compositions.

U.S. Pat. No. 4,156,067 issued on May 22, 1979 (the specification for which is incorporated by reference herein) discloses polyurethane polymers characterized by a molecular weight of above 6,000 and having lactone groups and hydroxyl groups in the polymer backbone being prepared by reacting a mixture of polyols, a polyfunctional lactone (e.g., epsilon caprolactone) and a polyfunctional isocyanate proportioned so as to provide certain desired polymer properties. It is indicated in said U.S. Pat. No. 4,156,067 that the product is soluble in alkaline solutions and may be used for light sensitive photographic layers on films, paper or glass; in drug delivery systems, as burn dressings, in body implants such as vascular prosthesis, in molding compositions, and in the manufacture of catheters as well as in delivery of perfume compositions in a slow release manner. It is further indicated in said U.S. Pat. No. 4,156,067 that the water absorptivity of the polyurethane/lactone polymers is above 10%, preferably in the range of about 20% to 60%, and these polymers may range in their physical properties from rigid solids to completely gel-like high water absorptive polymers. It is further indicated in said U.S. Pat. No. 4,156,067 that the polymers provide a leachable substrate wherein the leaching agent may be water, gases, alcohols, esters and body fluids, e.g., animal or human. The polymer system of U.s. Pat. No. 4,156,067 is different *in kind* from that of our invention. Nothing in said U.S. Pat. No. 4,156,067 however, discloses the unexpected and unobvious advantages of the homopolymers of epsilon caprolactone in their uses as carriers for effecting diagnosis of physiological or psychological functions or malfunctions in mammalian species, or for augmenting or enhancing the aroma of perfume compositions or perfumed articles; and/or as insect repellents and/or as animal repellents.

U.S. Pat. No. 4,156,067 further discloses a solution of perfume and a hydrophilic polyurethane polymer in a non-toxic solvent wherein said polyurethane polymer comprises the reaction product:

(A) one or more diols having an equivalent weight in the range of from about 100 to about 3,000, selected from the group consisting of:

(a) diethylene glycol, (b) long chain polyoxyalkylene diols, (c) linear polyester diols derived from the condensation of one or more diols with one or more dibasic acids, and (d) the reaction product of one or more alkylene diols with a difunctional linear polyester derived from the condensation of one or more diols with one or more dibasic acids;

(B) a polyfunctional lactone having the formula

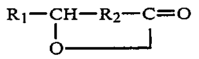

wherein $R_1$ is a monovalent radical selected from the group consisting of —H, —$CHNH_2$, —$SO_2CH_3$, —CHOHCOOH, and —$(CHOH)_nC$—$H_2OH$; n being an integer from 0 to 5; and $R_2$ is a divalent radical —($CHOH)_m$—; m being an integer from 2 to 10; and ethers derived from said lactones; and (C) a urethane precursor selected from the group consisting of organic polyisocyanates and nitrile carbonates.

U.S. Pat. No. 4,018,729 issued on Apr. 19, 1977 (the specification for which is incorprated by reference herein) as well as U.S. Pat. No. 3,992,336 issued on Oct. 1, 1974 (the specification for which is incorporated by reference herein) discloses articles for conditioning hair which are fabricated by blending water soluble polymers with water in soluble polymers (e.g., poly(epsilon caprolactone) to form interpenetrating networks so that the water soluble polymer can be extracted from the article when wet, or when brought in contact with wet hair. Nothing in said U.s. Pat. No. 4,018,729 discloses the concept of the instant invention.

In general, nothing in the prior art discloses the use of the polycaprolactone homopolymers as defined, supra, as devices for controlled release into a gaseous environment of diagnostic compositions, insect repellents, animal repellents, pheremones and perfume materials for use in perfume compositions, colognes and perfumed articles, e.g., solid or liquid anionic, cationic, nonionic or zwitterionic detergents, fabric softener articles and the like.

BRIEF DESCRIPTION OF THE DRAWINGS

FIG. 2 represents, in schematic form, a cut-away side elevation view of apparatus including a compounding extruder and pelletizer useful for forming the functional composition-containing poly(epsilon caprolactone) composition of our invention.

FIG. 3 illustrates, in perspective view, a partially cut-away pelletizer which is useful in conjunction with the compounding extruder which intimately admixes the functional substance and poly(epsilon caprolactone) homopolymer to form the composition of our invention.

FIG. 4 is a cut-away side elevation view of an extrusion apparatus useful for combining the functional substance (e.g., aromatizing material) with poly(epsilon caprolactone) or mixtures of poly(epsilon caprolactone)

and other polymers to form extruded tubing useful for practicing our invention.

FIG. 5A is a cut-away side elevation view of an injection molding apparatus prior to carrying out the injection molding of pellets containing functional substance and poly(epsilon caprolactone) homopolymer of our invention.

FIG. 5B is a cut-away side elevation view of an injection molding apparatus after the injection molding is carried out, whereby pellets or granules containing poly(epsilon caprolactone) homopolymer having imbedded therein functional substance is formed into a functional article.

Figure 6:
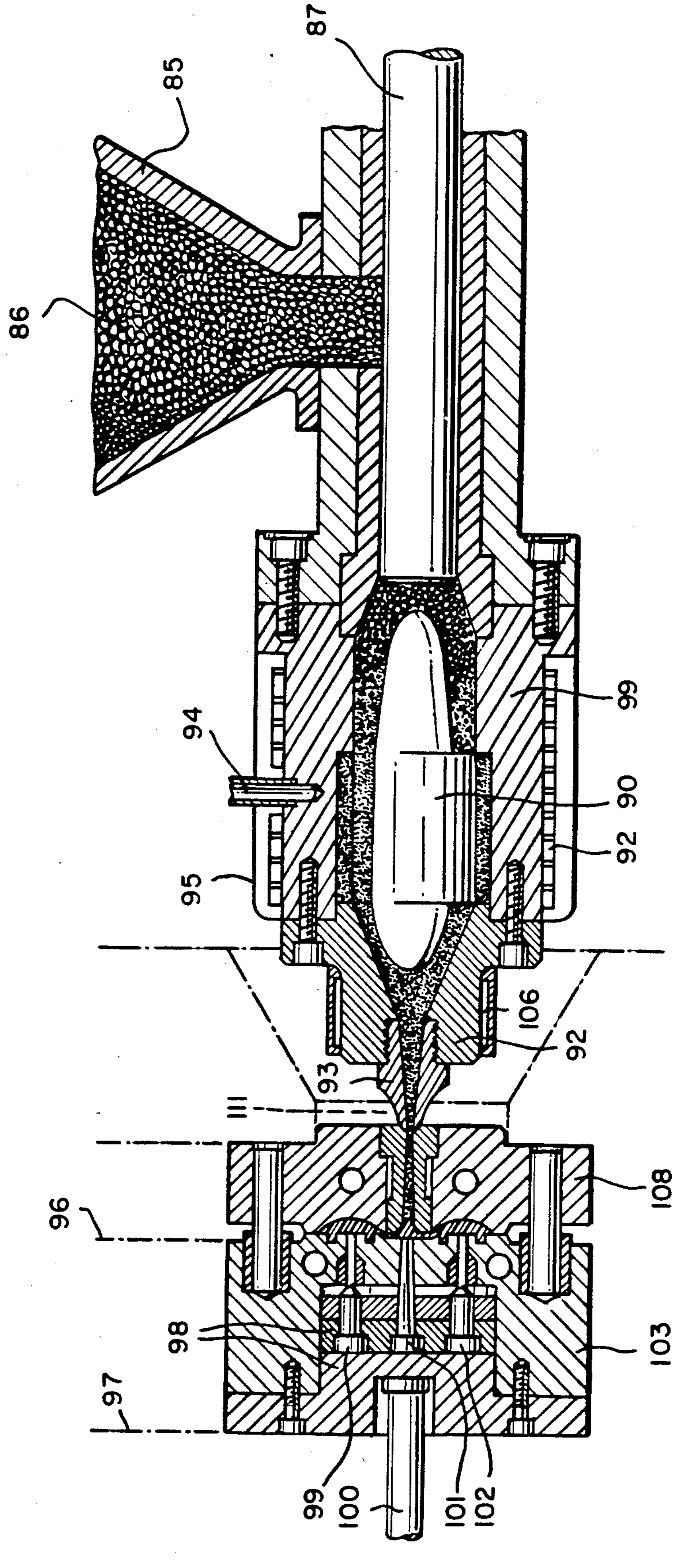

FIG. 6 is a cut-away side elevation view, in detail, of an injection molding apparatus useful for transforming the particles or pellets of poly(epsilon caprolactone) homopolymer having imbedded therein functional substance into functional articles.

Figure 7:
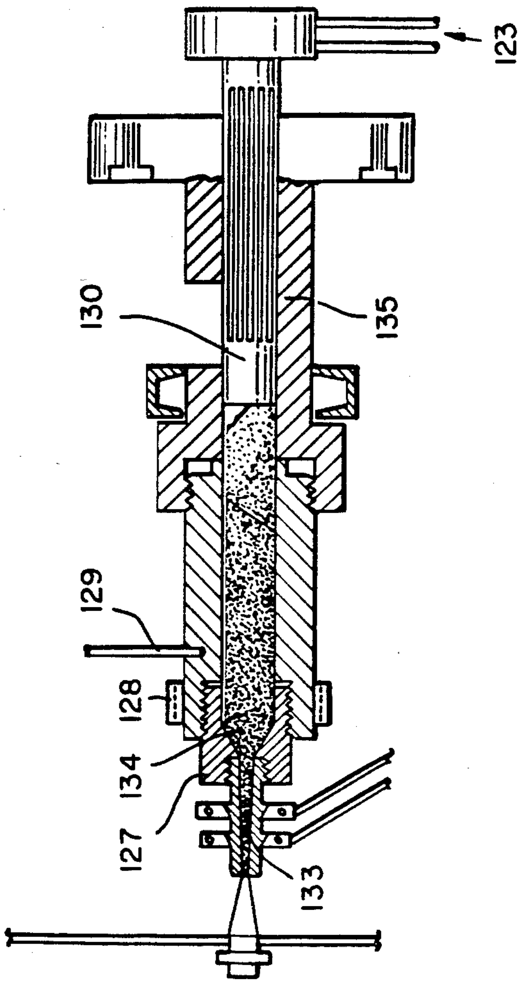

FIG. 7 is a cut-away side elevation view of a jet-molding apparatus useful in forming functional articles from pellets and/or particles consisting of poly(epsilon caprolactone) homopolymers having imbedded therein functional substances, e.g., aromatizing materials.

FIG. 8 is a partially cut-away perspective view of an article of manufacture useful in the operation of the apparatus of FIGS. 11, 12, 13 and 14 and containing homopolymers of poly(epsilon caprolactone) beads or pellets produced using the apparatus of FIGS. 2–7, inclusive, said beads containing a functional fluid, e.g., diagnostic composition, perfumery ingredient, insect repellent, pheremone or animal repellent.

FIG. 9 is a cut-away side elevation view of the article of manufacture of FIG. 8 looking in the direction of the arrows.

FIG. 10 is a top view of the article of manufacture of FIG. 8.

Figure 11:
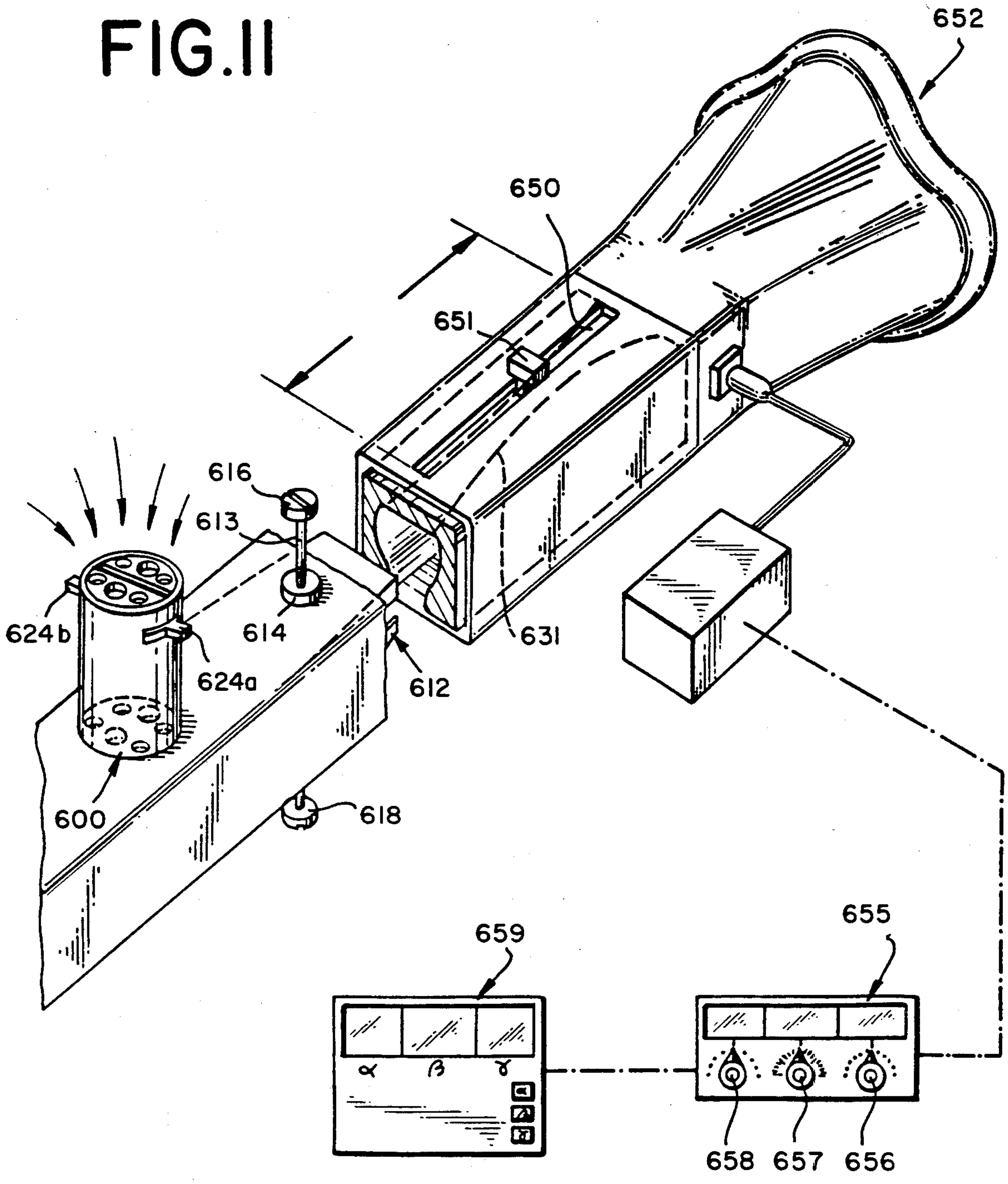

FIG. 11 is a perspective view of apparatus useful in utilizing the functional substance (fluid or solid) containing poly(epsilon caprolactones) of our invention having located therein in a detachably affixed fashion an article of manufacture containing said poly(epsilon caprolactone) functional substance (fluid or solid) particles of our invention and in addition, an adjustable Venturi nozzle; said apparatus, in addition, containing a medical diagnostic feature at the front and of said apparatus.

Figure 12:
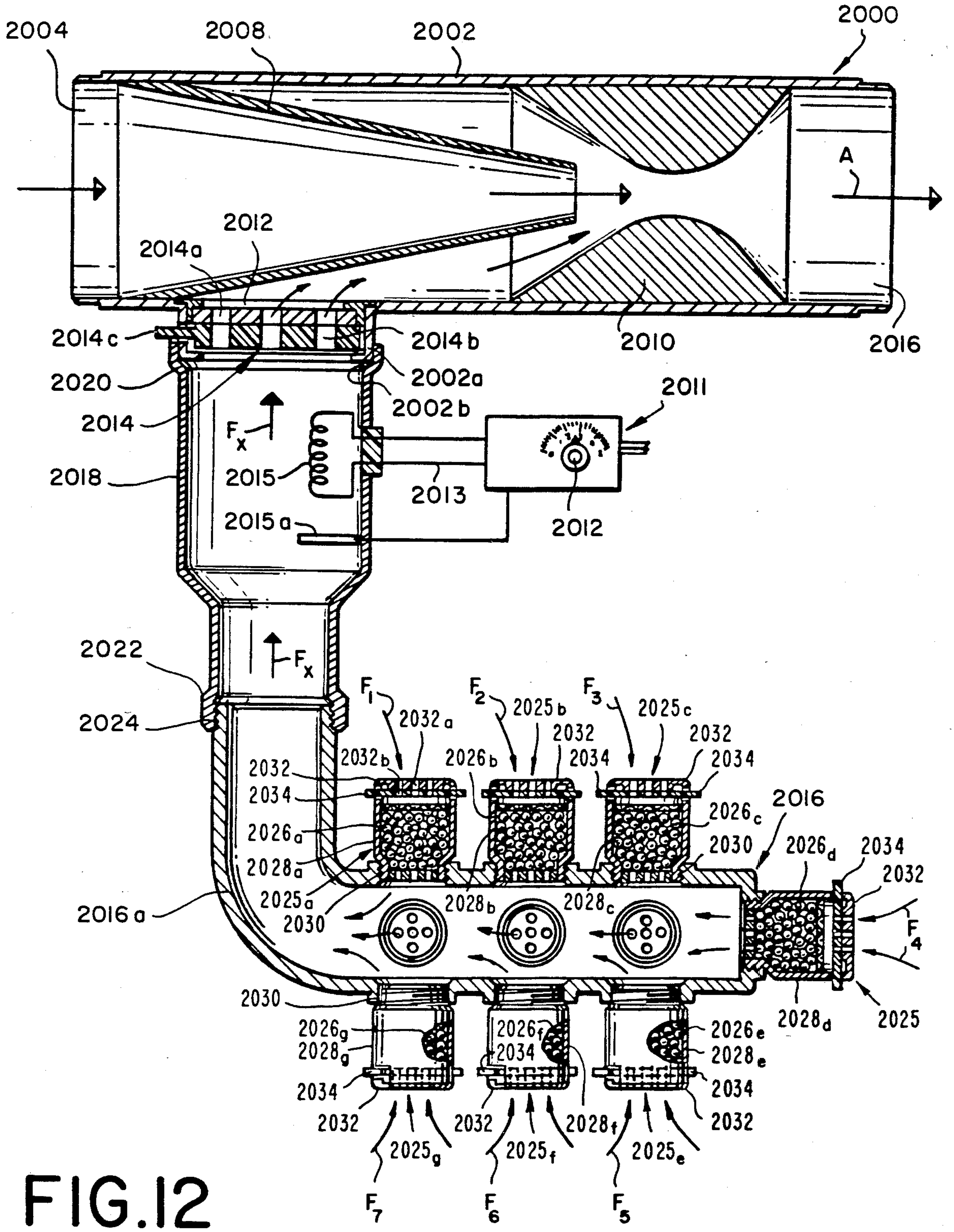

FIG. 12 is a cut-away side elevation view of a section of apparatus useful in employing the poly(epsilon caprolactone) functional fluid compositions of our invention, said apparatus (i) having detachably affixed thereto a manifold which contains a multiplicity of air pasage ways which enables air to flow past polymer surfaces; and (ii) said manifold having located therein, a multiplicity of detachably affixed versions of articles of manufacture containing the poly(epsilon caprolactone) functional substance (fluid or solid) of our invention.

Figure 13:
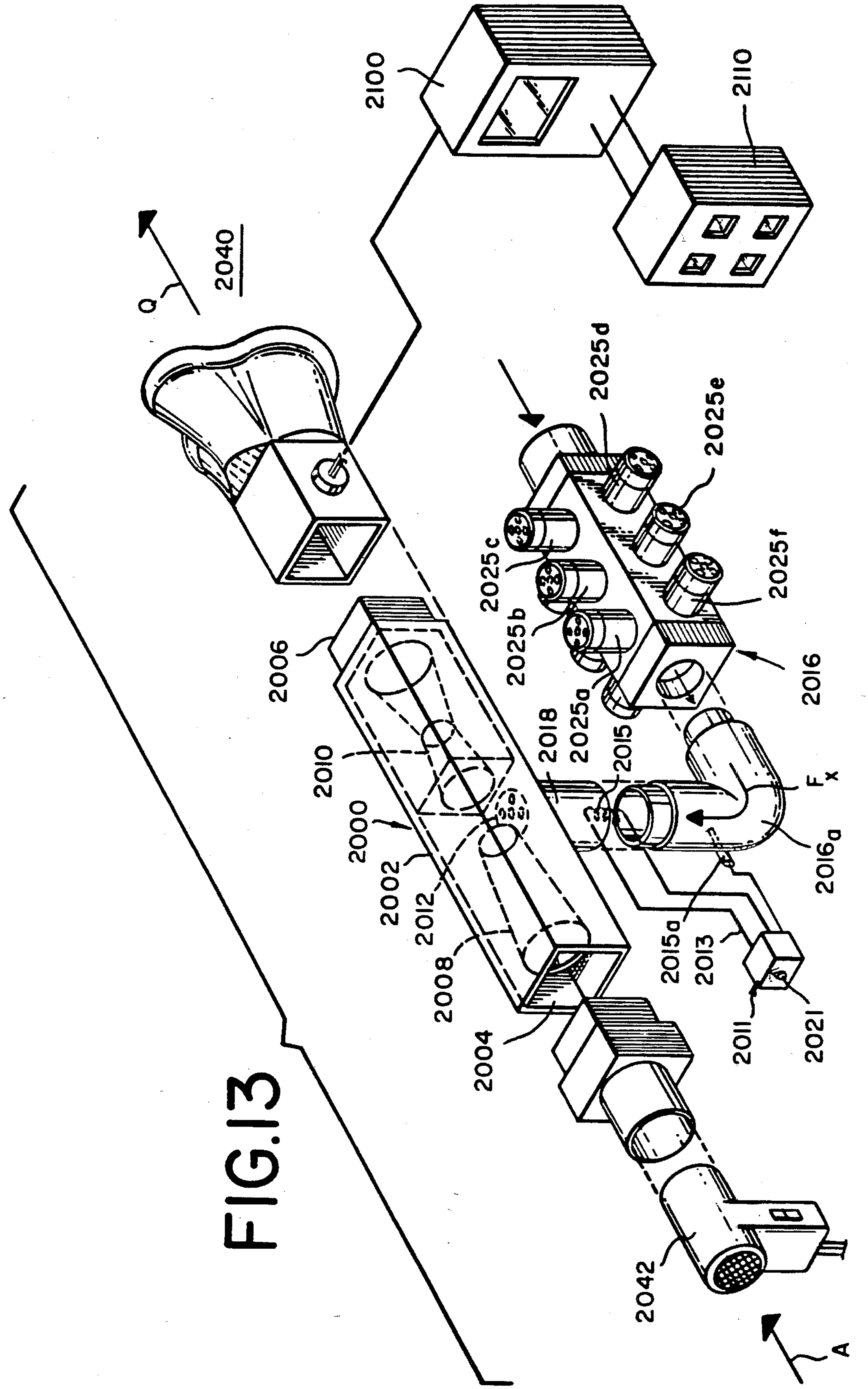

FIG. 13 is an exploded perspective view of an embodiment of the apparatus capable of utilizing the poly(epsilon caprolactone) functional substance (fluid or solid) composition of our invention whereby said apparatus is in the form of a medical diagnostic device.

Figure 14:
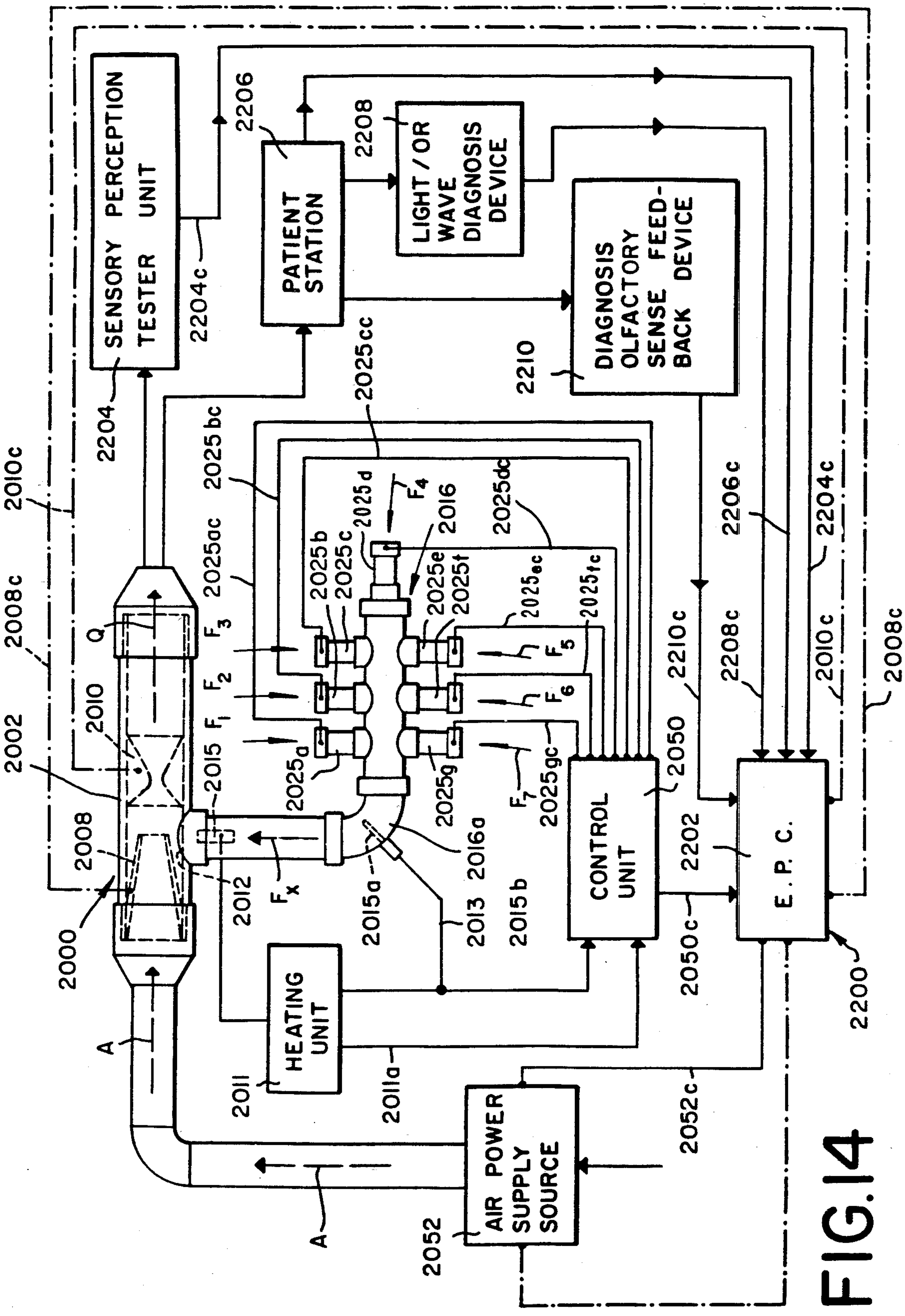

FIG. 14 is an exploded perspective view of the apparatus shown in FIG. 13 wherein a number of elements of said apparatus which are capable of creating a variation in the output of said apparatus are shown to be interconnected with an electronic program controller.

Figure 15:
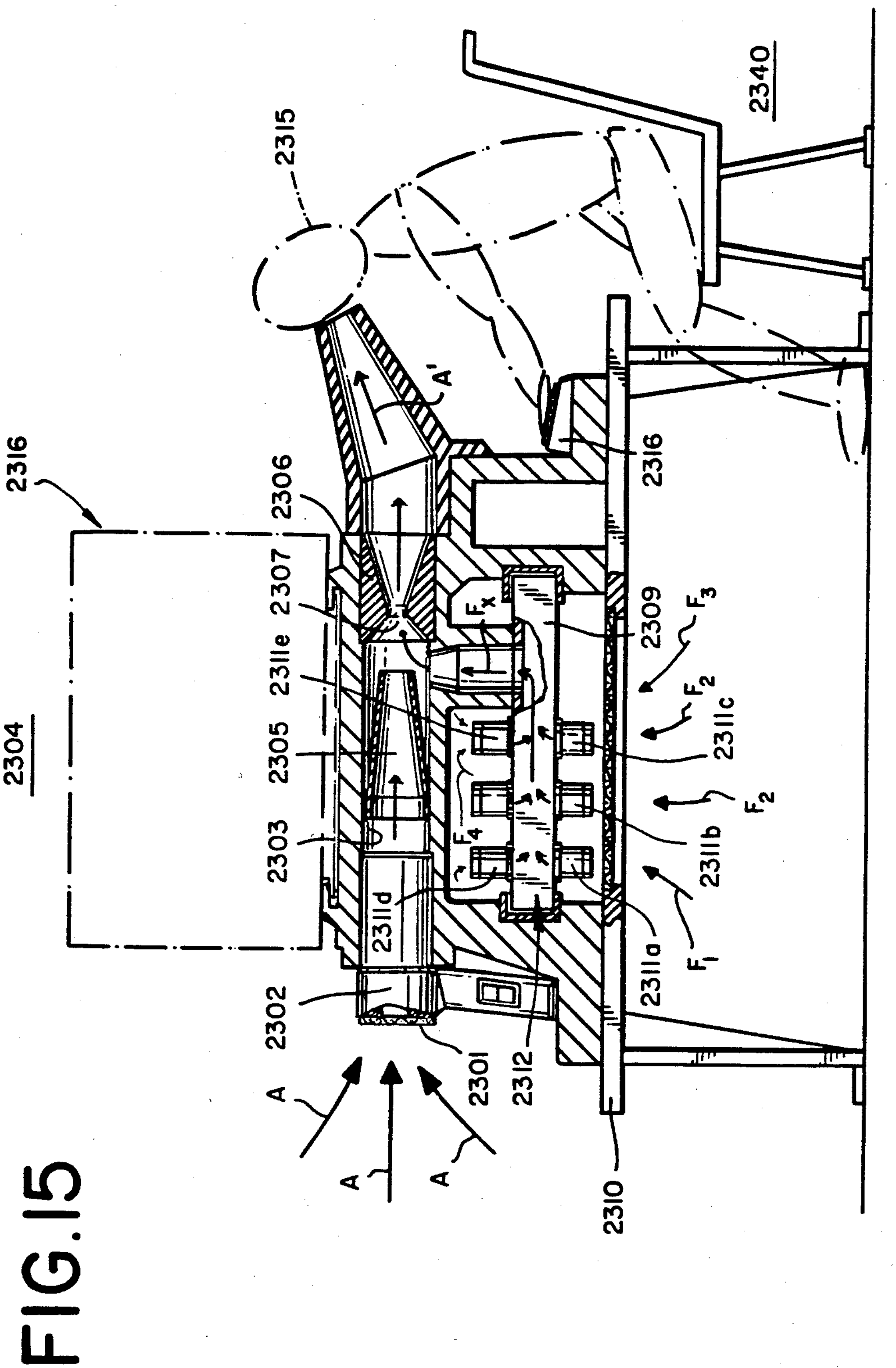

FIG. 15 is a cut-away side elevation view of a section of medical diagnosis and/or sensory perception apparatus useful in employing the poly(epsilon caprolactone) functional or (fluid or solid) composition of our invention.

FIG. 16 is a perspective view of an ellipsoidally-shaped detergent tablet containing a solid core which includes a mixture of (i) poly(epsilon caprolactone) homopolymer which is aromatized and (ii) an additional polyolefin polymer which may or may not be aromatized, e.g., polyethylene.

FIG. 17 is the top view of the elliposidally-shaped detergent tablet of FIG. 16.

FIG. 18 is a cut-away front view of the ellipsoidally-shaped detergent tablet of FIG. 16 in the direction of the arrows in FIG. 17.

FIG. 19 is the side view of the ellipsoidally-shaped detergent tablet of FIG. 16.

FIG. 20 is a perspective view of a rectangular parallelepiped-shaped detergent tablet containing a rectangular parallelepiped-shaped core comprising (i) a major proportion of poly(epsilon caprolactone)polymer which is aromatized and (ii) an additional polyolefin polymer which may or may not be aromatized.

FIG. 21 is a top view of the rectangular parallelepiped-shaped detergent tablet of FIG. 20.

FIG. 22 is a cut-away front view of the rectangular parallelepiped-shaped tablet of FIG. 20 looking in the direction of the arrows on FIG. 21.

FIG. 23 is a perspective view of an ellipsodially-shaped detergent tablet containing a hollow aroma imparting agent-containing core which includes aromatized poly(epsilon caprolactone) of our invention in admixture with an olefin polymer or in the alternative, a hollow core of polymer containing poly(epsilon caprolactone) in admixture with polyolefin polymer wherein the aroma imparting agent is in the solid polymer and not in the void of the plastic core.

FIG. 24 is a top view of the ellipsoidally-shaped detergent table of FIG. 23.

FIG. 25 is the front cut-away view of the ellipsoidally-shaped detergent tablet of FIG. 23 looking in the direction of the arrows on FIG. 24, the core thereof being hollow and either containing aroma imparting liquid or, in the alternative, being a hollow core wherein the aroma imparting material is in the solid polymer mixture [poly(epsilon caprolactone)-polyolefin] portion of the core and wherein the void does not contain anything.

FIG. 26 is a flow chart of a process used in conjunction with out invention for forming soap cakes containing aromatized cores which include aromatized poly-(epsilon caprolactone-polyolefin) mixture.

FIG. 27 is another flow chart of a process used in conjunction with the aromatized polymer or functional containing polymer of our invention for formulating reinforced soap cakes containing aromatized solid cores containing poly(epsilon caprolactone-polyolefin) mixture.

FIG. 28 is a fragmentary top plan view of a heated platen showing the configuration of the dish/cup-like portion of the platen wherein the aromatized poly(epsilon caprolactone-polyolefin) mixture pellets are compressed into plastic cores for incorporation into detergent tablets.

FIG. 29 is a fragmentary side elevational view with parts broken away and showing in section the heated platens of the apparatus of FIG. 28 during the compression step of the process of making cores of aromatized poly(epsilon caprolactone-polyolefin) mixture for the soap tablets used in conjunction with the present invention.

FIG. 30 is a perspective view of a heated platen part of the apparatus containing ellipsoidal voids, containing therein aromatized pellets which include in a major proportion, aromatized poly(epsilon caprolactone-polyolefin) mixture, ready for compression.

FIG. 31 is a schematic view of the heated platen of FIG. 30 after the compression step for compressing the aromatized polymeric pellets containing a major proportion of poly(epsilon caprolactone-polyolefin) mixture into aromatized plastic cores containing a major proportion of poly(epsilon caprolactone-polyolefin) mixture.

Figure 32:
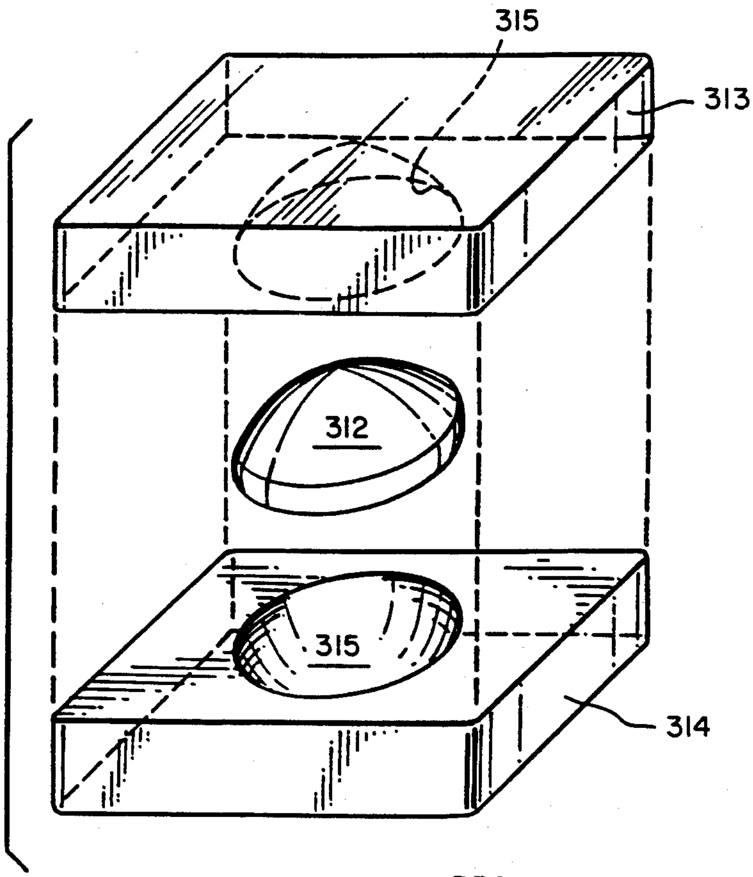

FIG. 32 is a perspective view of a technique for inclusion of an aromatized core containing a major proportion of poly(epsilon caprolactone-polyolefin) mixture into a detergent tablet using an upper detergent tablet section and a lower detergent tablet section.

Figure 33:
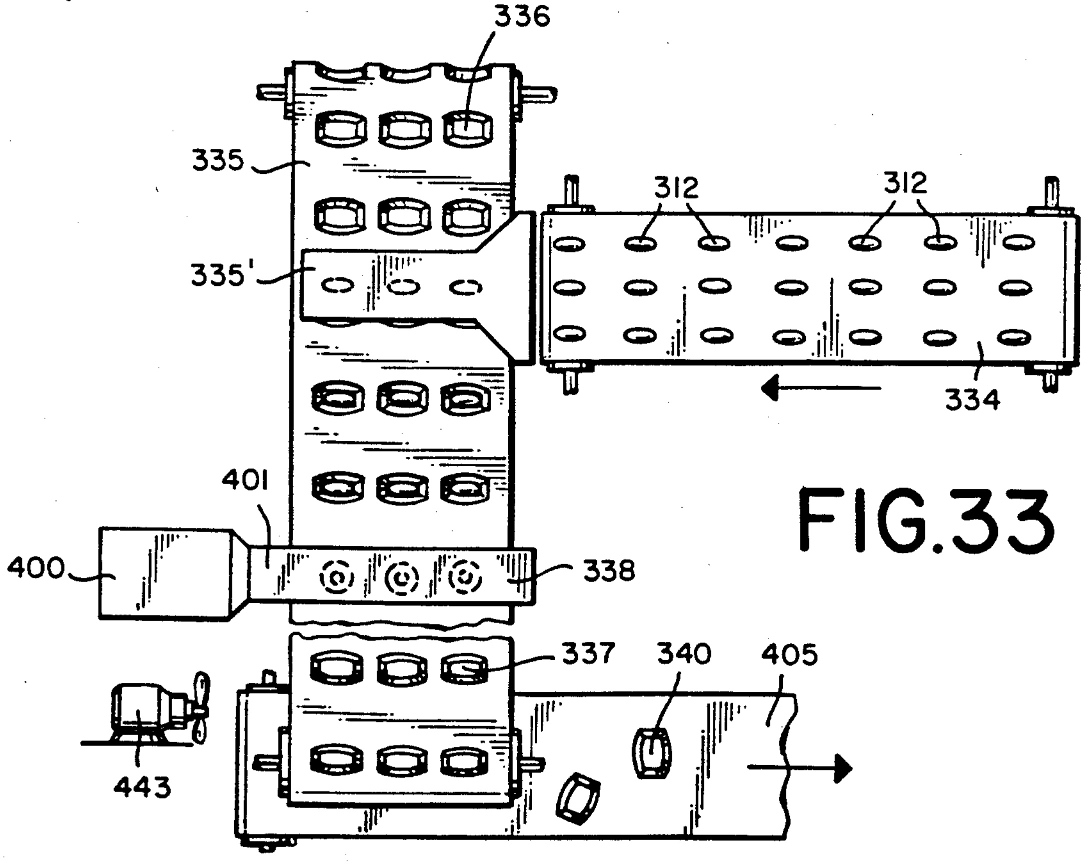

FIG. 33 is a top plan view of an alternative embodiment of the apparatus for preparing molded detergent tablets around aromatized cores containing a major proportion of poly(epsilon caprolactone-polyolefin) mixture, in operation.

Figure 34:
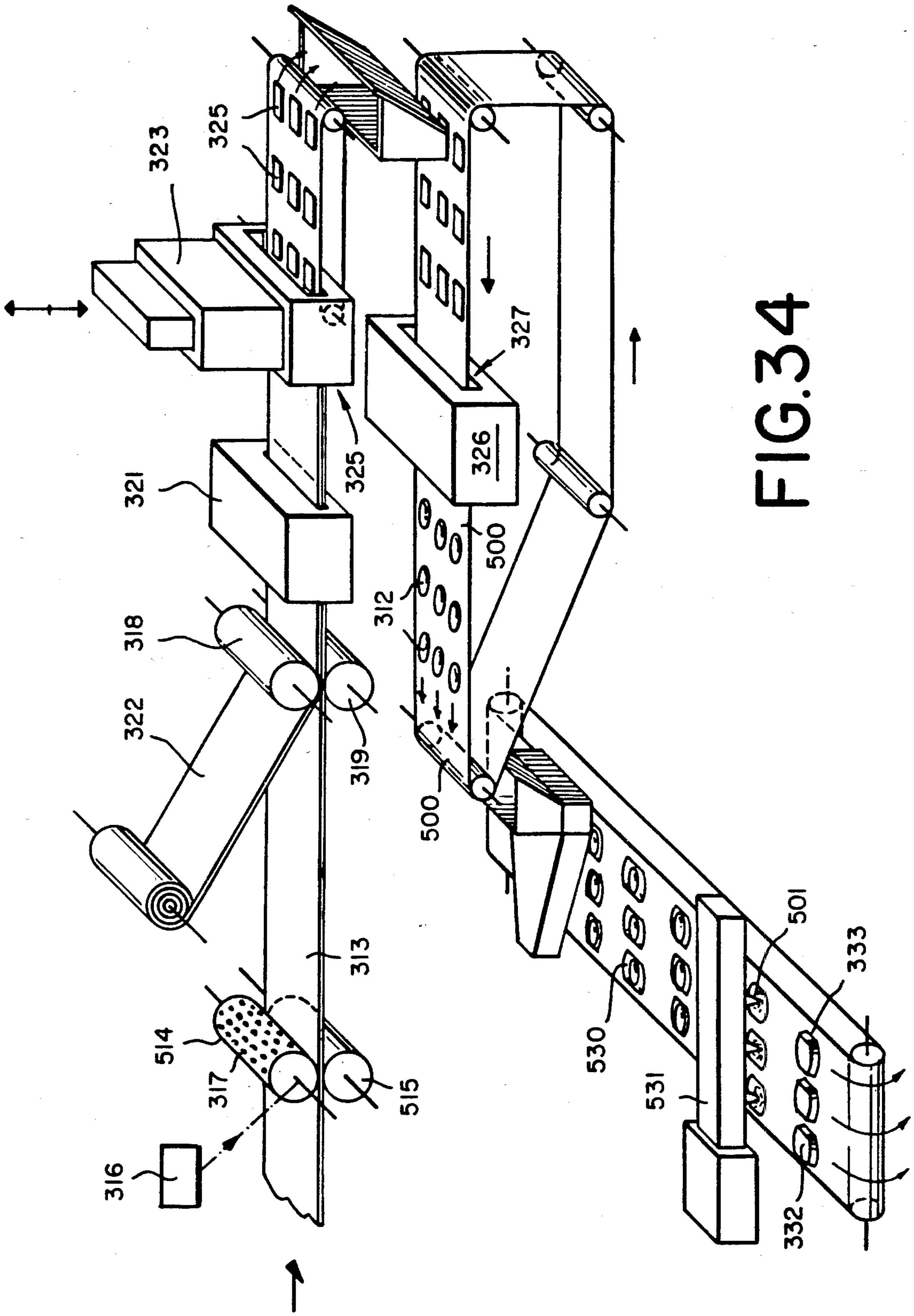

FIG. 34 is a perspective view of another embodiment of apparatus useful in conjunction with our invention showing the formation of the aromatized cores containing a major proportion of poly(epsilon caprolactone-polyolefin) mixture and formation of molded soap around the cores containing poly(epsilon caprolactone-polyolefin) mixture.

Figure 35:
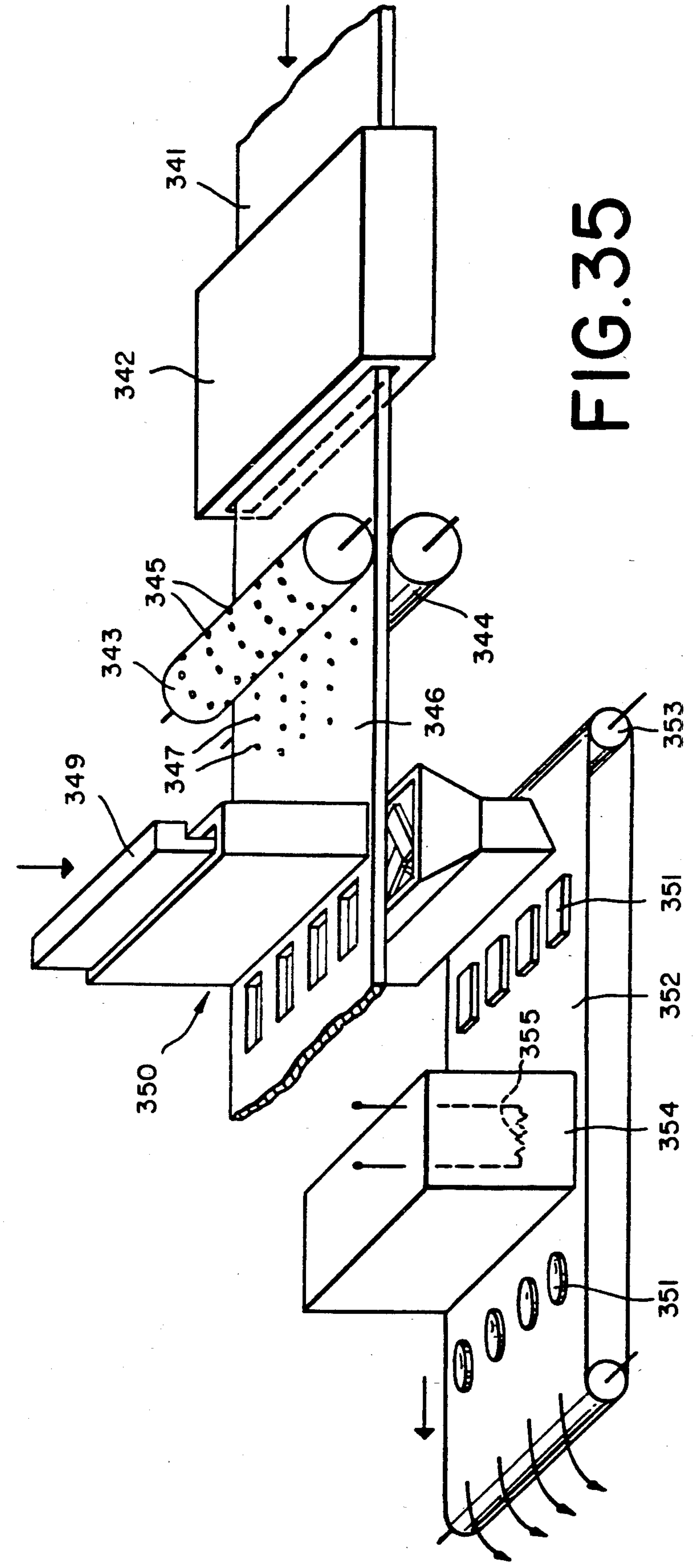

FIG. 35 is a perspective view of another embodiment of our invention for formation of the aromatized poly(epsilon caprolactone-polyolefin) cores of our invention useable in preparing molded detergent tablets.

SUMMARY OF THE INVENTION

Our invention relates to the utilization of controlled release technology for the controlled release of functional substances (fluids or solids) into gaseous environments from poly(epsilon caprolactone) homopolymers defined according to the structures:

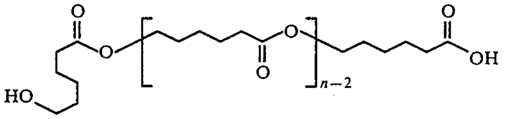

and, optionally,

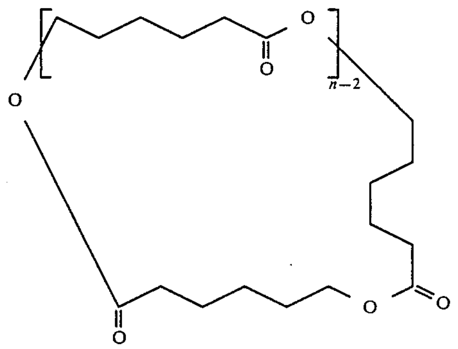

wherein n varies from about 500 up to about 1,200 with the proviso that the average "n" in the system varies from about 600 up to about 800 according to the mathematical statement:

$$[800 \geqq \bar{n} \geqq 600]$$

with the term $\bar{n}$ being the average number of repeating monomeric units for the epsilon caprolactone homopolymer, or mixtures of such homopolymers with other polymers (e.g., polyolefin such as polyethylene or polypropylene) or copolymers as defined, infra.

The functional fluids or solids contained in said polymer or mixture of polymers may be perfume materials, pheremones, materials capable of being useful for diagnosing physiological or psychological aberrations or malfunctions in mammalian species, animal repellents, insect repellents or the like. The release rate from such poly(epsilon caprolactone) polymers taken alone or in admixture with the other polymers e.g., polyethylene or polypropylene or copolymers is close to "zero order". As a general rule, the release rate in a polymeric matrix is proportional to a first order until about 60% of the functional fluid is released from the polymeric matrix. The release rate thereafter is related exponentially to time as a general rule according to the equation:

$$\frac{dM_t}{dt} = k_1 e^{-k_2 t}$$

wherein $k_1$ and $k_2$ are constants. According to Kydonieus, "Controlled Release Technologies: Methods, Theory, and Applications" (cited, supra) the amount of functional fluid released systems which are describable as physically dispersed nonerodible polymeric or elastomeric matrices is proportional as long as the concentration of functional fluid present (dispersed and dissolved) is higher than the solubility of the agent in the matrix. Thus, such dispersed systems are similar to the dissolved systems except that instead of a decreased release rate after 60% of the functional fluid or solid has been emitted the relationship holds almost over the complete release curve. Kydonieus further states, that if one assumes that the release of functional fluid by diffusion is negligible in monolithic erodible systems, the speed of erosion will control the release rate and release by erosion by a surface-area-dependent phenomenon, the release being constant (zero order) as long as the surface area does not change during the erosion process. Kydonieus further states, that laminated structures if the distribution coefficient of the functional fluid between the reservoir layer and the barrier membrane is much smaller than unity, the system approximates "zero order" release (reservoir system with rate-controlling membrane), and the amount released per unit time is independent of time whereas if the distribution coefficient is close to unity, the system approximates a first order release (monolithic, physically dispersed system).

We have found however, that in the specific case of using epsilon polycaprolactone homopolymers taken alone or in admixture with other polymers, the rate of release of functional fluid or solid from the epsilon caprolactone homopolymer is quite close to "zero order" rather than being proportional to first order or following the equation:

$$\frac{dM_t}{dt} = k_1 e^{-k_2 t}$$

wherein $k_1$ and $k_2$ are constants.

The poly(epsilon caprolactone) polymers useful in practicing our invention are more specifically described in the brochure of the Union Carbide Corporation, 270 Park Avenue, New York, New York 10017, entitled "NEW POLYCAPROLACTONE THERMOPLASTIC POLYMERS PCL-300 AND PCL-700". Such poly(epsilon caprolactone polymers are composed of a repeating sequence of non-polar methylene groups and relatively polar ester groups. The average number of repeating momomeric units for polymers useful with our invention varies between 600 and 800.

The poly(epsilon caprolactone) homopolymers useful in the practice of our invention may also be stabilized using the stabilizers defined in U.S. Pat. No. 4,360,682 issued on Nov. 23, 1982 (the specification for which is incorporated herein by reference). The stabilizing materials which stabilize the poly(epsilon caprolactone) useful in conjunction with our invention against discoloration are dihydroxybenzenes such hydroquinone or compounds having the formula:

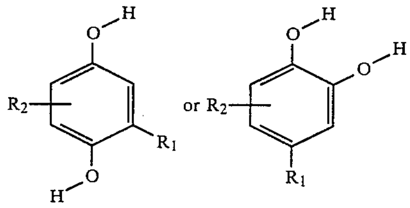

in which $R_1$ is alkyl of from 1 to 8 carbon atoms, and $R_2$ is hydrogen or alkyl of 1 to 8 carbon atoms. It is preferable to have such stabilizer in the poly(epsilon caprolactone) homopolymer in an amount of from about 100 to 500 ppm. Such stabilizers do not interfere with the functional fluids dissolved and/or adsorbed into the polymeric matrix.

The functional fluid or solid may be incorporated into the poly(epsilon caprolactone) homopolymer or mixture of poly(epsilon caprolactone) with other polymers, e.g., polyolefin such as polyethylene or polypropylene or copolymers, using standard extrusion techniques.

Thus, in accordance with one aspect of our invention the imparting of the functional fluid or solid, e.g., scent, is effected in two stages. In a first stage, poly(epsilon caprolactone) homopolymer, e.g., PCL-700 is added at a first point in the extruder or is admixed with such additives as opacifiers, processing aids, color masterbatches, pearlescent agents, densifiers or blowing agents and at a point downstream on the extruder, the functional fluid or solid is added. Downstream from the addition point of the solid or liquid functional fluid, e.g., scent, mixing takes place. On exiting from the extruder the extruded mixed rod is pelletized using a standard pelletizer. The resulting pellets or "beads" will contain a high percentage of functional fluid or solid e.g., scent which can be up to 25 percent by weight of the entire mixture. These pellets or beads may be used as "master pellets" which thereafter, in a second stage, if desired, may be admixed in a second extruder, for example, with additional polymers such as poly(epsilon caprolactone) in an unscented state or unscented polyolefin, e.g., polyethylene or polypropylene. In addition, additional polymers or copolymers may be used, for example, mixtures of copolymers specifically described in United Kingdom Patent Specification No. 1,589,201 published on May 7, 1981, (the specification for which is incorporated by reference herein).

The following specific extruders may be utilized in practicing the process of our invention:

(i) The extruders described and exemplified in U.S. Pat. No. 4,363,611 issued on Dec. 14, 1982, (the specification for which is incorporated by reference herein);

(ii) Welding Engineers Inc. (King of Prussia, Pa. 19406) CRT (counter rotating tangential) twin screw extruder;

(iii) Welding Engineers WE twin screw extruder;

(iv) The Leistritz twin screw extruder manufactured by the American Leistritz Extruder Corporation of 198 Route 206 South, Sommerville, N.J. 08876;

(v) The Werner & Pfleiderer ZAK twin-screw corotating extruder manufactured by the Werner & Pfleiderer Corporation of 663 East Crescent Avenue, Ramsey, N.Y. 07446;

(vi) The Farrel continuous orbatch extruder manufactured by the Farrel Connecticut Division, M. Hart Machinery Group, Ansonia, Conn. 06401;

(vii) The Baker Perkins MPC/V compounder manufactured by the Baker Perkins Inc. Chemical Machinery Division, Saginaw, Mich. 48601;

(viii) The Berstorff intermeshing co-rotating twin-screw extruder ZE 130X28D manufactured by the Berstorff, P.O. Box 240357, 8200-A Arrowridge Boulevard, Charlotte, N.C. 28224.

Accompanying the extruder is desirably a pelletizer as illustrated in FIG. 3. Specific examples of pelletizers are:

(i) Underwater strand pelletizer produced by Carl G. Brimmekamp & Company, Inc., 102 Hamilton Avenue, Stamford, Conn. 06902;

(ii) The G-Force Pelletizer manufactured by the Baker Perkins Inc. as disclosed in Modern Plastics, page 52, Dec. 1982 edition;

(iii) Gala Industries underwater pelletizing system manufactured by Gala Industries, R.F. 2, Box 126 Eagle Rock, Va. 24085.

The feed rate of poly(epsilon caprolactone) homopolymer taken alone or taken further together with other polymers, e.g., polyolefin such as polypropylene and polyethylene is in the range of from about 70 up to about 350 pounds per hour. Correspondingly, the feed rate of functional fluid or solid may be in the range of from about 1 percent up to about 30 percent of the rate of the poly(epsilon caprolactone) homopolymer taken alone or further together with other polymer.

Thus, our invention provides a process for forming functional fluid or a solid containing poly(epsilon caprolactone) elements [which include poly(epsilon caprolactone) homopolymers taken alone or further together with other polymers such as polyolefin, e.g., polypropylene and polyethylene] such as pellets which comprise heating the poly(epsilon caprolactone) homopolymer taken alone or taken further together with other polymers with a material having a particular function in, for example, a single screw or double screw extruder, e.g., a selected scent or aroma, or a diagnostic material which can be used to diagnose physiological or psychological malfunctions or aberratons in mammalian species at temperatures and pressures whereby the poly(epsilon caprolactone) homopolymer taken alone or further together with other polymers remain liquid at the point of mixing with the functional fluid or solid, such as a temperature in the range of from about 150° F. up to about 200° F.

According to a second aspect of our invention a poly(epsilon caprolactone) thermoplastic resin body is provided which faithfully retains the aroma of a perfume material contained therein from which the perfume oil does not exude to a significant extent and which consists essentially of a poly(epsilon caprolactone) homopolymer having the structure:

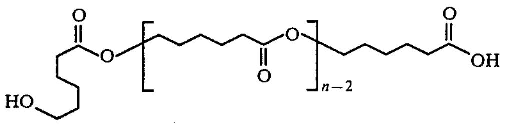

and, optionally, in addition,

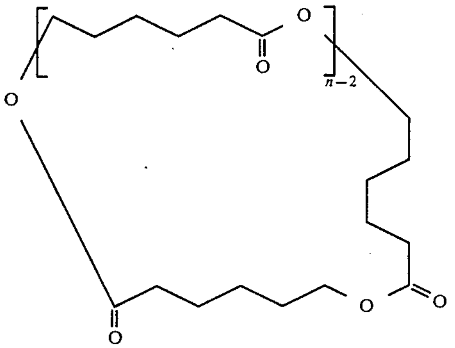

wherein n varies from about 500 up to about 1,200 with an average number of repeating monomeric units of between 600 and 800 and from about 6 up to 60% by weight of a copolymer of ethylene and a polar vinyl monomer selected from (a) vinyl acetate (b) ethyl acrylate (c) methyl acrylate (d) butyl acrylate; and (e) acrylic acid including the hydrolyzed copolymer of ethylene and vinyl acetate. The resulting mixture can contain up to 25% by weight of perfume oil and/or other functional fluid or solid including insect repellent or animal repellent or pheremone or physiological or psychological diagnostic agent. The preferred copolymers are ethylene-vinyl acetate with about 9 to 60% vinyl acetate and ethylene ethyl acrylate with about 6 to 18% ethyl acrylate. These copolymers have been found to synergistically effect the ability of the resulting mixture of the copolymer and poly(epsilon caprolactone) to retain functional fluids or solids, e.g., perfumes, insect repellents, animal repellents, pheremones and materials capable of diagnosis of physiological and/or psychological aberrations or malfunctions of mammalian species.

Resins of the type disclosed for use as copolymers are commercially available in the molding powder form. For example, ethylene-vinyl acetate copolymers are marketed by E. I. Du Pont de Nemours and Company under the tradename "ELVAX®" and Arco Polymer Division under the trademark "DYLAND" and by the Exxon Corporation of Linden, N.J. under the trademark "DEXXON". Ethylene ethyl acrylate copolymers are marketed by Union Carbide Corporation, under the tradename "EEA RESINS".

With reference to this second embodiment of our invention, a process suitable for making the functional fluid or solid-resin bodies of this invention comprises heating the poly(epsilon caprolactone) homopolymer and copolymer mixture until it is sufficiently molten to be practically workable. This can be done in a standard mixing operation prior to introduction into the extruder or it can be done by simply mixing the pellets of the respective polymer materials and adding them to a single screw or twin screw extruder prior to mixing with the functional fluid or solid. The heating temperature is usually between 150° and 220° F. for these mixtures. The functional fluid or solid, e.g., perfume oil, is added to the extruder downstream from the addition point of the resin and by means of the operation of the extruder is blended through the mass until at the end of the extruder a uniform mixture is obtained. Since each of the resins of the mixture is thermoplastic, no solvent is required for the blending. The mass containing the functional fluid or solid, e.g., the perfume, can either be pelletized and reduced into a molding powder for subsequent use in the injection molding apparatus of FIGS. 5A, 5B and 6 or the jet molding apparatus of FIG. 7.

Exposure to the melting, blending and molding temperatures of these mixtures of resins, e.g., the poly(epsilon caprolactone) homopolymers and the copolymer does not negatively affect the functionality of the functional fluid or solid, e.g., the perfume odor or the pheremonal efficacy of the like.

In general the salient properties which set our resin/-functional fluid or solid body apart from the prior art resin/functional fluid bodies are:

(i) A much lower melting point;

(ii) The ability to hold as much as 25 percent by weight functional fluid or solid in the resin body; and (iii) The ability to steadily deliver functional fluid or solid to the surrounding atmosphere at a steady rate over relatively long periods of time.

Thus, molding powder produced as described, supra, can be processed through injection or compression molding and the original odor will be faithfully retained. In fact, the fragrance will be faithfully retained for several months storage and in many cases up to a year or more even when the resin body is exposed to the atmosphere.

Perfume oils suitable for our invention in the aforementioned embodiments include substantially any of the conventional fragrance materials available to one having ordinary skill in the art. These are complex mixtures, for example, of volatile compounds including esters, ethers, aldehydes, alcohols, lactones, unsaturated cyclic and acyclic hydrocarbons, natural essential oils and synthetic essential oils well known to those skilled in the fragrance art.

Their use as to type and proportion is limited only by either their absorptivity in the resin or mixture of resins. The proportion can go up to 25 percent by weight of the resin body.

Thus, the proportion of perfume oil or other functional fluid or solid to resin, accordingly, can vary from small but effective amounts on the order of about 1 percent of the weight of the resin body up to about 25 percent. In general, it is preferred to use between about 5 percent up to about 25 percent based on the weight of the resin body which is an optimum value balancing the proportion of perfume oil or other functional fluid or solid in the product against the time period over which the article emits the functional fluid or solid (e.g., odor and/or repellent material and/or diagnostic agent and the like.

Examples of animal repellents useful as functional fluids or solids in conjunction with all aspects of our invention are set forth in U.S. Pat. No. 3,474,176 issued on Oct. 21, 1969, the specification for which is incorporated by reference herein. In this respect, our invention provides safe, effective compositions for controlling animals whereby the materials can be in the form of sheets or strips of polymer containing the animal repellent tied about trees, plants and the like.

Briefly, the animal repellents useful in our invention comprise a suitable carrier compatible with the resins, e.g., the poly(epsilon caprolactones) and, if desired, other polymers (e.g., polyolefin such as polyethylene and polypropylene) or copolymers admixed therewith and an aliphatic or alicyclic ketone containing from about 6 up to about 20 carbon atoms. The ketones are present in the composition in amounts effective to repel animals from the area in which the polymeric sheet is placed. The method of our invention comprises placing such a polymeric sheet containing an aliphatic or alicyclic ketone having from about 6 up to about 20 carbon atoms in the area where the mammalian species roam. The effective repellent substances are ketones which contain preferably from about 7 up to about 19 carbon atoms. The ketones can be saturated or unsaturated aliphatic or alicyclic which contain preferably from about 7 up to about 19 carbon atoms. The ketones can be saturated or unsaturated aliphatic or alicyclic materials. The ketones desirably used in our invention are exemplified by ethylbutyl ketone, methylisoamyl ketone, geranyl acetone, ethyl-n-amyl ketone, methyloctyl ketone, heptylidene acetone, isobutylheptyl ketone, methylundecyl ketone, methylhexyl ketone and 2-methyl-6-heptanone. Preferred ketones are ethylbutyl ketone, methylisoamyl ketone, and 4-t-amylcyclohexanone.

In place of, or in addition to the animal repellents, bird repellents can be used in a similar manner with our invention with the polymer composition of our invention. Such bird repellents are set forth in U.S. Pat. No. 2,967,128 issued on Jan. 3, 1961 the specification for which is incorporated by reference herein. As used herein "birds" are members of the class "Aves". Birds both domestic and wild such as chickens, turkeys, ducks, pheasants, crows, etc. cause much damage from an economic standpoint by eating newly planted seeds, ripening grain crops, stored corn, berries, fruits, etc.

Our invention utilizes esters of anthranilic acids, esters of phenyl acetic acid and dimethyl benzyl carbinol acetate as bird repellents which are compatible with the poly(epsilon caprolactone) taken alone or further, together with the copolymers of our invention.

Thus, esters useful in our invention which are esters of phenyl acetic acid includes such wide varieties of ester moieties as alkyls, alkenyls, aryls, aralkyl and the like. The alkyl phenyl acetates specifically exemplified are methyl phenyl acetate, ethyl phenyl acetate and isobutyl phenyl acetate. Insofar as the anthranylates are concerned as bird repellents, the optimum preferred ester for use in conjunction with the poly(epsilon caprolactone) polymer containing composition of our invention is dimethyl anthranilate (methyl ortho-N-methylaminobenzoate). Other anthranilates or ethyl anthranilates are phenyl ethyl anthranilate, methyl anthranilate and menthyl anthranilate.

As stated, supra, the poly(epsilon caprolactones) containing functional fluids or solids of our invention can be intimately admixed with other materials, or they can be interlayered with other materials. Examples of such materials and mixtures are as follows:

(i) The multiple layers disclosed in U.S. Pat. No. 4,306,552 issued on Dec. 22, 1981 the specification for which is incorporated by reference herein;

(ii) A mixture of poly(epsilon caprolactone) together with chlorinated PVC as set forth in *Polymer* 1982, 23 (7,Suppl.), 1051–6 abstracted in Chem.Abstract 97:145570y, 1982;

(iii) Redfern "epsilon caprolactone"- a specialty chemical for the 1980's (Interox Chem. Ltd., U.K.), Spec.Chem., 1982, 2(2), 17–18, 20–1, abstracted at Chem.Abstract, Vol. 97:110411v (Oct. 4, 1982);

(iv) Mixtures of the poly(epsilon caprolactone) copolymers containing functional fluids or solids taken together with poly(epsilon caprolactone), made by means of alcohol-initiated polymerization as disclosed in J. Polym. Sci. Polym. Chem. Ed. 1982, 20(2) pages 319–26, abstracted at Chem. Abst., Vol. 96:123625x, 1982;

(v) Blends of poly(epsilon caprolactone) homopolymer containing functional fluid or solid and styrene-acrylonitrile copolymers as disclosed in Diss. Abstr. Int. B 1982, 42(8), 3346 and abstracted at Chem.Abst. 96:143750n (1982);

(vi) Blends of poly(epsilon caprolactone) homopolymer containing functional fluid and copolymers of poly(epsilon caprolactone) with 1,4-butane diol as disclosed Kauch, Rezina, 1982, (2), 8–9, abstracted at Chem.Abstr., Vol. 96:182506g (1982);

(vii) Blends of poly(epsilon caprolactone) homopolymer containing functional fluid and polyesters as disclosed in U.S. Pat. No. 4,326,010, abstracted at Chem.Abst., Vol. 96:226596t; (U.S. Pat. No. 4,326,010 and its specification are incorporated by reference herein);

(viii) Mixtures of poly(epsilon caprolactone) homopolymer containing functional fluid and diethyl phthalate and titanium dioxide as disclosed in Japanese Pat. No. J81/148355, abstracted at Chem.Abstracts, Vol. 96110187f (1982);

(ix) Mixtures of poly(epsilon caprolactone) homopolymer containing functional fluid and chlorinated polyethylene blends as disclosed by Belorgey, et al, J. Polym. Sci. Polym. Phys. Ed. 1982, 20(2) 191–203;

(x) Plasticized poly(epsilon caprolactone) copolymers containing dimethyl phthalate plasticizers as set forth in Japanese Pat. No. J81/147844, abstracted at Chem.Abstract, Vol. 96:69984y (1982);

(xi) Mixtures of poly(epsilon caprolactone) homopolymers containing functional fluids and maleic anhydride modified adducts of poly(epsilon caprolactone) polyols and an ethylenically unsaturated monomer as disclosed in U.S. Pat. No. 4,137,279 issued on Jan. 30, 1979, the specification for which is incorporated by reference herein.

DETAILED DESCRIPTION OF THE DRAWINGS

Figure 1A:
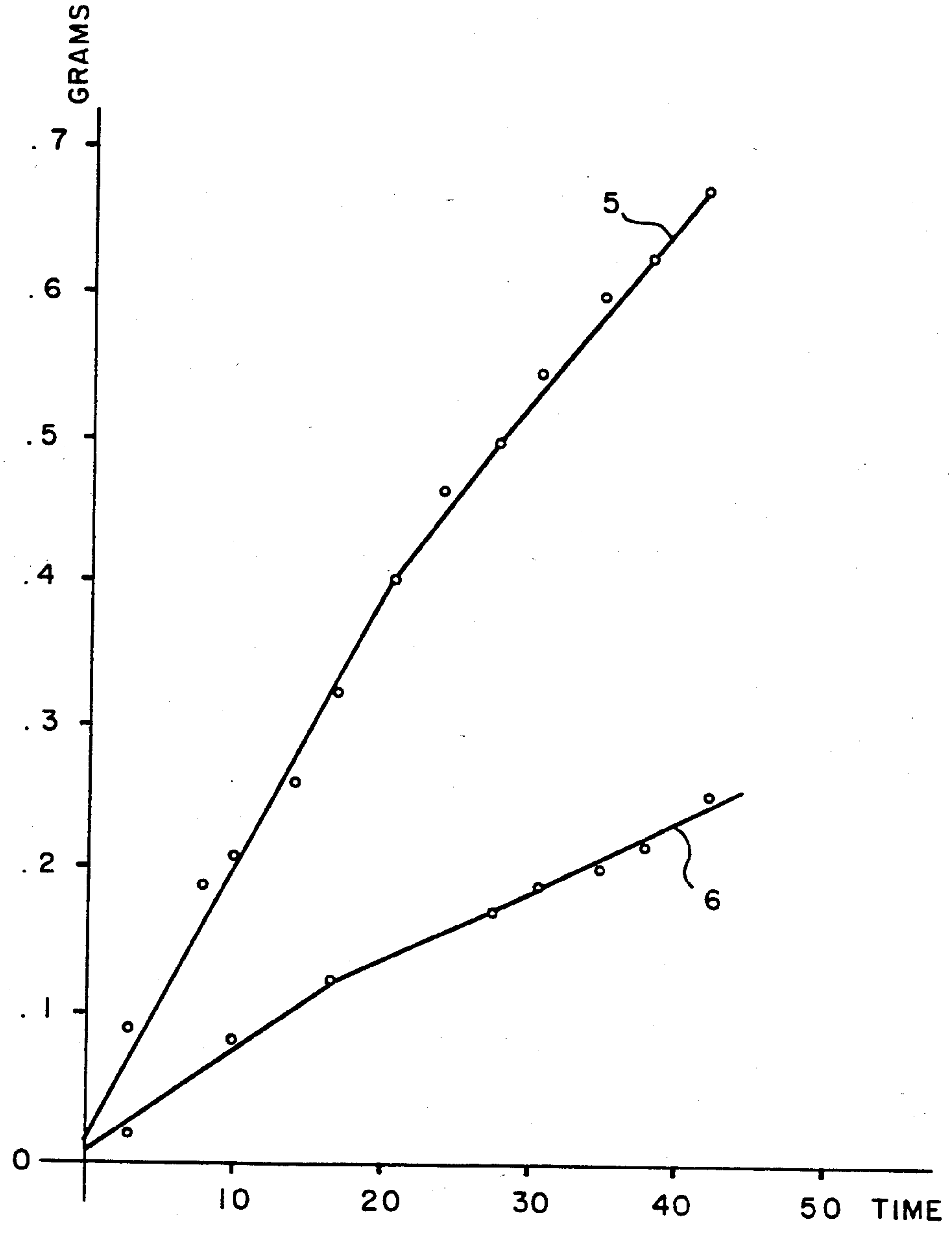
FIG. 1A represents graphs showing the slow release of perfumes from poly(epsilon caprolactone) matrices produced in accordance with the procedure of Example I wherein the "vertical" axis represents amounts of perfume material released from the polycaprolactone matrix and the "horizontal" axis represents the time taken for the release of the amount of material shown on the "vertical" axis.

FIG. 1A sets forth two graphs indicating the rate of release of a fragrance from a poly(epsilon caprolactone) homopolymer having an average number of repeating monomeric units of 700. The graph indicated by reference numeral "5" is for a poly(epsilon caprolactone) homopolymer containing, initially 25% by weight of fragrance. The graph indicated by reference numeral "6" is a graph showing the rate of release of perfume from the poly(epsilon caprolactone) homopolymer having an average number of repeating monomeric units of 700 where the initial concentration of fragrance in the poly(epsilon caprolactone) homopolymer is 10%.The formation of the poly(epsilon caprolactone) homopolymer containing perfume is more specifically disclosed in Example I, infra.

Figure 1B:
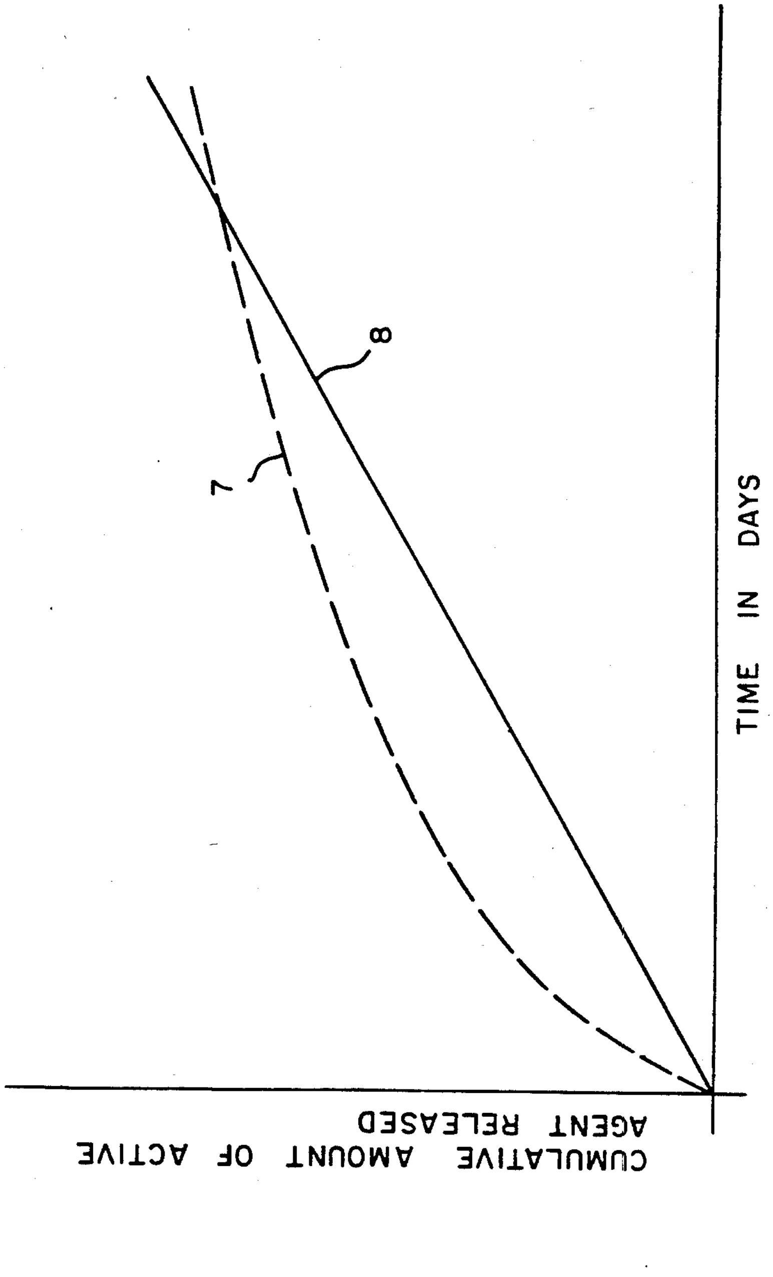
FIG. 1B is a graph showing the difference of "zero order" and first order release of functional substances from polymeric or elastomeric matrices as set forth in the book entitled "Controlled Release Technologies: Methods, Theory, and Applications", Volume I, by Agis F. Kydonieus (Published by CRC Press, Inc., Boca Raton, Florida).

FIG. 1B is a graph of time versus cumulative amount of active ingredient released for a functional fluid from a polymeric matrix and is a representation of FIG. 4 on page 14 of the book entitled "Controlled Release Technologies:Methods, Theory and Applications", Vol. I, by Agis F. Kydonieus, published by CRC Press, Inc., Boca Raton, Fl. The graph indicated by reference numeral "7" is the graph for a first order release. The graph indicated by reference numeral "8" is the graph for zero order release.

Referring to FIGS. 2, 3 and 4, there is provided a process for forming scented poly(epsilon caprolactone) homopolymer elements (wherein the homopolymer may be "as is" or taken in admixture with other polymers or copolymers, such as polyethylene or polypropylene or copolymers such as polyethylene-polyvinyl acetate copolymer) such as pellets useful in the formation of plastic particles useful in fabricating certain articles (as by using the injection molding apparatus of FIGS. 5A, 5B and 6 or the jet molding apparatus of FIG. 7) which may be perfumed or may contain other functional fluids or solids such as articles useful in the diagnosis of physiological or psychological aberrations or malfunctions of mammalian species.

This process comprises feeding particles of the poly-(epsilon caprolactone) homopolymer taken alone or in admixture with other polymers or copolymers into a single screw or double screw extruder upstream from the location of the simultaneous feeding to the extruder of a selected functional fluid or solid at an extruder temperature and extruder pressure such that the poly-(epsilon caprolactone) homopolymer taken alone or in admixture with other polymers or copolymers will be in the liquid phase such as a temperature in the range of 160°-210° F. prior to the point of the extruder where the functional solid or fluid inlet port exists.

If a poly(epsilon caprolactone) homopolymer such as one having an average number of a repeating monomeric units of about 700 is used, it has a flow point in the range of about 190°-200° F. at atmospheric pressure and about 15° F. lower at extruder pressures. The viscosity is in the range of 80-90 sayboldt seconds at such temperatures.

The operating temperature is maintained in the extruder preferably by using high pressure steam and/or electric thermostatic elements which permit a control temperature in the range of from about 160° up to about 220° F.

Thus, referring to FIG. 2, a power source 15 drives a single screw or a twin screw extruder located in shaft 16 while there is fed into the extruder barrel through entry port 14 the resin, the pelletized or powdered poly(epsilon caprolactone) homopolymer taken alone or in admixture with other polymers such as polyethylene and polypropylene at location 12. If desired, from location 13 other additives including opacifiers, processing aids, color masterbatches, pearlescent agents, densifiers and blowing agents may be added to the resin. Simultaneously, there is added from location 17 a fuctional fluid pumped into the extruder using gearpump 23 into the extruder at location 23A. If there are 15 barrel segments starting with barrel "1" at location 14 then the functional fluid or solid is added at barrel segments 3-8, preferably as the mixed functional fluid or solid and resin passes through the extruder barrel past location 19 (vacuum line) and is extruded out in a "rope" it is preferably passed through water bath 20 and then into pelletizer 21 forming pellets which are collected after emanating from pelletizer at 21A. The barrel segments at which the functional fluids or solid is added are segments indicated by reference numerals "18A", "18B", "18C" and "18D".

FIG. 3 sets forth a g-force pelletizer which may be used in conjunction with the single or double screw extruder of FIG. 2. The extrusion "rope" enters the pelletizer at location 435 (zero pressure infeed and travels through a spinning extrusion die 436 which is operated on bearings 434. Moving pellet knife 431 operated by dual knife units 430A and 430B cuts the "rope" into pellets which fly into the cooling water stream at 432 and exit as a pellet slurry at location 433.

FIG. 4 illustrates a cross-sectional side view of a type of extrusion machine useful in utilizing the poly(epsilon caprolactone) homopolymers taken alone or in admixture with other polymers or copolymers for forming extruded tubing which can subsequently be pelletized in such apparatus as is set forth in FIG. 3. A feeder hopper 30 containing poly(epsilon caprolactone) homopolymer particles taken alone or in admixture with particles of other polymer 31 leading into a plasticizing cylinder 32 fitted with a screw conveyor or fitted with two intermeshing screw conveyers 34 which forces the mix towards die 37 at a uniform rate and pressure is heated to progressively higher temperatures so that the extruded tubing emerges from the orifice 38 in a highly plastic condition. The extruded member is laid down in a groove in moving conveyer 40 propelled by conveyer shaft 41 and immediately subjected to cooling. When subjected to cooling the material will harden at a point between 39A and 39B on conveyer belt 40. Between locations 34 and 37 of the screw conveyer of screw conveyers the functional fluid or solid is fed from holding tank 450 through line 460 and valve 461 by means of solid or liquid pump 462. The pressure can be regulated by means of vacuum line 43 using valve 42. In making tubing, provision may be made to blow a continuous blast of air through the inside of the tubing to prevent it from collapsing if desired.

FIGS. 5A, 5B and 6 set forth cross-sectional views of injection molding apparatus useful in formulating articles containing the poly(epsilon caprolactone) homopolymer taken alone or further together with other polymers such as polyethylene or polypropylene. The molding mix 71 is fed through feed hopper 70 into cylinder 72 whereupon plunger 73 forces the poly(epsilon caprolactone) homopolymer taken alone or further together with other polymers through the cylinder at location 74 past heating unit 75 through orifices 78-79 and which consists of the mold cavity 77 and mold plunger 81 may be in an open position as shown in FIG. 5A or a closed position as shown in FIG. 5B. The molding mix 71 in the form of granules is fed into the plasticizing cylinder 74 through hopper 70. When the mold opens the cylinder plunger 73 moves back permitting material to drop into the cylinder at location 74. On the closing stroke the mold members 81 and 77 lock tightly together and the cylinder plunger 73 moves forward forcing the newly delivered poly(epsilon caprolactone) homopolymer taken alone or further together with other polymer from the hopper 70 into the heating zone 75 heated by heating unit 76 of the cylinder. The material in turn, displaces a "shot" of molten material through the nozzle into the mold cavity 80-82. The mold 77-81 is then cooled so that the "shot" hardens quickly. Conditions are controlled so that the molten plastic consisting of poly(epsilon caprolactone) homopolymer taken alone or further together with other polymers such as polyethylene and polypropylene just has time to reach the outermost recesses of the mold cavity before flow ceases. When the mold is open the formed piece is loosened by knockout pins and can be removed by hand. These "knock-out pins" are indicated by reference numeral "101" in FIG. 6.

Referring to FIG. 6, FIG. 6 is a detailed cut-away side view diagram of injection molding apparatus. Poly-(epsilon caprolactone) homopolymer (taken alone or further together with other polymers such as polyethylene or polypropylene) as a molding mix in the form of granules is fed into the plasticizing cylinder at location 89 through feed hopper 85. The cylinder is indicated by reference numeral "88". When the movable part of the mold 103 opens, the cylinder plunger 87 moves back permitting material 86 to drop into the cylinder at location 89. On the closing stroke the mold members 103 and 108 lock tightly together and the cylinder plunger 87 moves forward forcing newly delivered material consisting of poly(epsilon caprolactone) homopolymer taken alone or further together with other polymers such as polyethylene from the hopper 85 into the heating zone of the cylinder 91. The heating zone of the cylinder is fitted with thermocouple 94 and jacket 95. Heating medium are passed through jackets 95 and 106 at location 92. The molten material, in turn, displaces a "shot" of molten material through the nozzle into the mold cavity. The mold is cooled so that the "shot" hardens quickly. Conditions are controlled so that the molten plastic just has time to reach the outermost recess of the mold cavity before flow ceases. When the mold is opened the formed piece is loosened by knock-out pins 101 and removed. The functions of torpedo 90 (also termed a "spreader") is to spread the mix into thin films and facilitate uniform heating as it passes toward the nozzle 93.

The cylinder temperature is varied to suit the flow characteristics of the mix and size of the mold cavity. Too low a cyclinder temperature will mean insufficient flow while too high a cylinder temperature or too long a period between shots may result in charring or decomposition or destruction of additional material including the functional fluid or solid.

The cylinder temperature for poly(epsilon caprolactone) homopolymer having from about 600 up to about 800 repeating monomeric units is between 150°and 210° F. When 50:50 weight:weight mixtures of polyethylene, e.g., such as that prepared according to U.S. Pat. No. 4,366,298 issued on Dec. 28, 1982, (the specification for which is incorporated by reference herein) then the cylinder temperature may vary between 220° and 260° F. and the molding pressure is from about 5 up to about 30 psig. When higher ratios of polyethylene:poly(epsilon caprolactone) homopolymer are used, e.g., 60:40 the cylinder temperature may vary between 250°and 280° F. and the molding pressure will vary between 24 and 35 psig.

In FIG. 6, the mold consists of a movable platen 97; a stationary platen 96; orifice 111; movable section 103; guide pin 104; ejector pin 102; sprue lock pin 102; ejector rod 100; ejector pin 99; and injector plates 98. Cooling channel 110 provide for cooling fluid whereby the molded article is cooled.

Referring to FIG. 7, FIG. 7 is a cut-away side elevation view of a jet molding heater for jet molding the particles of poly(epsilon caprolactone) homopolymer taken alone or further together with other polymers such as polyethylene. A polymer mix is fed into a hopper and from thence falls into a feed cylinder 135. The material is then moved forward toward the nozzle at location 134 end of the cylinder by pressure applied by the injection plunger 130 which has plunger water cooling connections 123. Pressures range from 15,000-90,000 psig depending upon the quantity of other polymer in the mix besides the poly(epsilon caprolactone) homopolymer. Thus, when poly(epsilon caprolactone) homopolymer is used lower pressures may be used, such as 15-22,000 psig; but when higher quantities of such materials as polyethylene as produced according to U.S. Pat. No. 4,366,298 issued on Dec. 28, 1982, are used the pressures are upwards of 40-75,000 psig; and when polypropylene is utilized in admixture with the poly(epsilon caprolactone), even in weight ratios of 50:50 pressures upwards of 80-90,000 psig are used. As the mix nears the nozzle 127, mild heat is applied from band heater 128 controlled using controlling thermal couple 129. The heat maintained is between 150° and 200° F. The high pressure of the fluted plunger 130 causes the polymer to begin to flow into the nozzle at location 133. As soon as the molten shot has passed through the nozzle 133 and enters the mold, it is subject to cooling and hardens by means of the lowering of the temperature. After the injection of the shot is complete and the mold is filled, the injection pressure is released, the induction heating is removed and the nozzle 133 is cooled rapidly by water from location 125 which is kept circulating continuously through the electrodes.

The poly(epsilon caprolactone) homopolymers taken alone or taken further together with other polymers such as polyethylene and polypropylene may be utilized in various devices which take advantage of the presence of the slowly releasable functional fluid or solid from the pellets of poly(epsilon caprolactone) homopolymer taken alone or further together with other polymers. Thus, for example, such pellets may be utilized for diagnostic devices for diagnosing the malfunctions of mammalian species; or such devices may be used as air fresheners or room odorants or merely for testing the abilities of a potential perfumer.

Accordingly, another feature of our invention is the mass flow control device (useable in such apparatus as set forth above) which can be made an integral part of the article utilizing the functional fluid or solid containing polymers of our invention as is shown in FIGS. 8, 9 and 10. Thus, after placing the polymeric pellets 167 into cylinder 166 (the pellets, for example, being pellets 44 produced according to the apparatus shown in FIGS. 2 and 7) the article which includes mass flow rate accessory 164 with protrusions 163A and 163B is placed into the apparatus shown in FIGS. 11, 12, 13 or 14. As air or another gas flows through the duct past constriction 631, air is sucked into and through article 166 past openings 162 of the article and 161 of the mass flow rate control device past pellets 167 through openings 162 into the main stream through duct opening 168 into the environment. Protrusions 163A and 163B can be operated laterally at openings 165 in the article of FIGS. 8, 9 and 10 whereby the size of the openings 161 can be varied from "no flow" to "full flow" where the openings 161 precisely coincide with the openings 162.

The operation and full disclosure of the articles of FIGS. 8, 9 and 10 as used in conjunction with apparatus FIGS. 11, 12, 13 and 14 in disclosed in copending application for U.S. Letters Patent, Ser. No. 377,953 filed on May 13, 1982, (the specification for which is incorporated by reference herein) and is further disclosed, infra.

Thus, FIGS. 11, 12, 13, 14 and 15 illustrate devices containing adjustable Venturi throats resulting from the use of nozzles having adjustable openings used in conjunction with articles which contain the poly(epsilon caprolactone) homopolymers containing functional fluids of our invention. Examples of variable throat Venturi devices are known in the prior art as set forth in U.S. Pat. Nos. 1,583,301, 4,043,772 ("Venturi Scrubber with Variable Area Throat"), U.S. Pat. No. 4,023,942 ("Variable Throat Venturi Scrubber") and U.S. Pat. No. 3,768,234 ("Venturi Scrubber System Including Control of Liquid Flow Responsive to Gas Flow Rate").

In FIG. 11, a nozzle 612 may be adjusted by bringing closer together or further apart nozzle edges using adjustment screw device 613 fixed via screw threads at 614 to a duct. A main gas stream flow through nozzle 612 adjusted by, for example, adjustment screw 613 via screw caps 616 and 618 past Venturi throat 631. Gas is aspirated through holes in article 600 having a polymer body contained therein which contains poly(epsilon caprolactone) homopolymer (taken alone or further together with other polymers) and functional fluid or solid which can be desorbed from the article into the main gas stream flowing through the article 600. The functional fluid or solid gas stream then travels past location 612 to a mixing point in the proximity of reference numeral 631 to form a fixed functional fluid or solid gas stream. The gas mass control rate again may be controlled using protrusions 624*a* and 624*b* whereby the mass flow rate of aspirated gas may be controlled and slowed down or speeded up as the holes in the article 600 are aligned or malaligned with one another. The apparatus can also include the feature of having the Venturi throat 631 shifted laterally by means of the use of the lateral slot 650 wherein Venturi throat 631 can be shifted laterally along slot 650 using protrusion 651 to move the Venturi throat. An additional feature of the apparatus of FIG. 11 is the inclusion of a human sensory area 652 wherein a person can detect variable aromas and aroma concentrations or the brain can detect various compositions of matter which are volatile and which emanate from article 600. These compositions of matter are useful in diagnosing physiological or psychological malfunctions or aberrations of mammalian species. The person sensing the organoleptic properties evolving from article 600 will then manipulate dials 656, 657 and 658 in device 655 thereby creating readings in device 659 which can be used to aid the diagnosis of various maladies.

Referring to FIG. 12 wherein various diagnosing and/or air treatment substances are adsorbed onto polymeric particles poly(epsilon caprolactone) homopolymer particles which also may contain, if desired, other polymers, e.g., polyethylene or copolymers, e.g., polyethylene-polyvinyl acetate) 2018*a*, 2018*b*, 2018*c* and 2018*d*, these substances may be desorbed in a controlled manner into manifold 2020 and thence through elbow 2016 and duct 2010 past openings 2007 and 2008 into air stream "A". This presupposes that air stream "A" is moving in the direction indicated through the nozzle 2001 past Venturi 2003 having Venturi throat 2002 contained in the main duct 2000. The multiplicity of articles of manufacture of my invention 2017*a*, 2017*b*, 2017*c*, 2017*d*, 2017*e*, 2017*f*, 2017*g*, 2017*h*, 2017*k*, 2017*m* and other articles of manufacture which may be detachably affixed at, for example, 2019*a* to manifold 2020 may be manipulated whereby air streams "$F_1$", "$F_2$", "$F_3$", "$F_4$", "$F_5$", "$F_6$" and "$F_7$", et al. may be varied insofar as their mass flow rates are concerned past the poly(epsilon caprolactone) polymeric particles-containing functional and/or diagnostic substance, said poly(epsilon caprolactone) (taken alone or further in conjunction with other polymers)—containing particles substances, said poly(epsilon caprolactone) containing particles being indicated by reference numerals "2919*a*", "2019*b*", "2019*c*", "2019*d*". . . "2019*m*". Each of these air streams "$F_1$", "$F_2$", "$F_3$", "$F_4$", "$F_5$", "$F_6$", "$F_7$", et seq. may be controlled by varying the variable openings 2023*a*, 2023*b*, 2023*c*, 2023*d*, et seq. using the variable opening device 2022*a*, 2022*b*, 2022*c*, et seq. In addition, the overall flow of mixed functional/diagnostic gas passing through openings 2007 and 2008 may be varied using control lever 2004 whereby the openings 2007 and 2008 may be offset from full flow to no flow.

Still another important feature of the utilization of the present invention is illustrated in FIG. 12 wherein a multiple manifold carrying a plurality of articles of manufacture may be used for diagnosing and/or treating the air with pleasant aromas and/or pheremones and/or air fresheners and/or insect repellents and/or animal repellets or pheremones is illustrated.

It is apparent that the apparatus 2000 illustrated in FIG. 12 comprises an elongated air duct 2002 having an air inlet 2004 and an air outlet 2006. The elongated air duct 2002 includes a nozzle 2008 and a Venturi throat 2010 which constitutes the aspirating mixing system of the present invention. Furthermore, the air duct 2002 includes an opening 2012 wherein a flow control device 2014 is conveniently arranged to control the overall flow of functional fluid passing therethrough.

A multiple manifold 2016 is operative by means of a connection to the elongated air duct 2002 through a duct 2018 having one end 2020 welded to a collar 2002*a* which is an integral part of the duct 2002 and provides a seat 2002*b* for the flow control device 2014. The opposite end 2022 of duct 2018 includes a male threaded portion 2024 capable of being connected to the open end of an elbow 2016*a*. It will be appreciated by the above construction that elbow 2016*a* constitutes an important part of the multiple manifold 2016 since it carries a multiplicity of articles of manufacture 2025*a*, 2025*b*, 2025*c*, 2025*d*, 2025*e*, 2025*f* and 2025*g* which may be detachably affixed theron. These articles of manufacture may contain various diagnosing and/or air treatment substances imbedded into or adsorbed on the poly-(epsilon caprolactone)—taken alone or taken further in conjunction with other polymers)—imbedded into or adsorbed on the poly(epsilon caprolactone)—containing polymeric particles 2026*a*, 2026*b*, . . . 2026*g* housed in cartridges 2028*a*, 2028*b*, 2028*c* . . . 2028*g* detachably connected to a threaded portion 2030 of elbow 2016. Each article of manufacture 2025*a*, 2025*b*, 2025*c* . . . 2025*g*, etc. may include an air flow control cap 2032 for controlling air streams "$F_1$", "$F_2$", "$F_3$", "$F_4$", "$F_5$", "$F_6$", "$F_7$", etc. in a controllable manner passing through each individual cartridge by varying the variable openings 2032*a* and 2032*b* of the flow control cap 2032 through a control lever 2034. Each control lever 2034 may be manipulated whereby air streams "F", "F", . . . "$F_7$", etc. may be varied insofar as their mass flow rates are connected past the poly(epsilon caprolactone) (taken alone or taken further together with other polymers)—containing polymeric particles containing functional and/or diagnostic substances adsorbed thereon and/or entrained therein.

However, the overall flow of mixed functional/diagnostic gas passing into air duct 2002 to be mixed with the air stream "A" moving in the direction indicated through the nozzle 2008 and Venturi throat 2010, may be varied using the flow control device 2014 whereby openings 2014*a* and 2014*b* may be offset from full flow to no flow through a control lever 2014*c*.

The gas stream "$F_x$" which is the sum of the air streams "$F_1$", "$F_2$", "$F_3$", "$F_4$", "$F_5$", "$F_6$", "$F_7$", et seq. and the sum of the mass flow rates of functional and/or diagnostic fluid or solid being desorbed from polymer particles 2026*a*, 2026*b*, et seq., "$F_{p1}$", "$F_{p2}$", "$F_{p3}$" et seq. is shown by the equation:

$$\Sigma[F_n+F_{pn}]=F_x$$

wherein "$F_n$" is the flow rate of the air through the articles of manufacture of my invention 2025*a*, 2025*b*, 2025*c*, et seq. and the flow rate of the desorbed functional/diagnostic fluid or solid from the polymeric particles in the articles of manufacture of our invention "$F_{p1}$", "$F_{p2}$", "$F_{p3}$" et seq. Thus, "$F_n$" is defined according to the equation:

$$\sum_{1}^{ni}[F_1+F_2+\ldots+F_{ni}]=F_n$$

and "$F_{pn}$" is defined according to the equation:

$$\sum_{p1}^{pni}[F_{p1}+F_{p2}+\ldots+F_{pni}]=F_{pn}$$

The flow of the functional fluid or solid combined with the aspirated air "$F_1$", "$F_2$", "$F_3$", "$F_4$", "$F_5$" is shown as "$F_x$" and joins the main gas stream "A" at Venturi throat 2010 whereby the sum total of gas streams evolving at 2006 from duct 2002 is shown as "Q" or "$F_x$+A" thusly:

$$\Sigma[F_x+A]=Q.$$

The temperature of stream "$F_x$" may be controlled using heating means 2011 having a control device 2012 which may be manually or automatically controlled by means of an electronic program controller. The control line 2013 is operatively connected to a heating device 2015 which may be continuous or intermittent operatively connected to a temperature sensing device 2015*a* which may be connected via thermostat to said heating means 2011.

The input of air streams "$F_1$", "$F_2$", "$F_3$", "$F_4$", "$F_5$", "$F_6$" et seq. into manifold 2016 may also be controlled using an electronic program controller as will be seen by an examination of FIG. 14, infra.

The apparatus of FIG. 12 can be used as an air freshening device or a medical diagnostic device or an olfactory testing device, for example, a device useful in testing the olfactory senses of prospective perfumers or flavorists in the perfume and flavor industry. The device can also be used to devise novel fragrance formulations whereby the tester detects the aromas evolving at 2006, the tester or individual being diagnosed for medical diagnoses located at location 2040 as shown in FIG. 13.

FIG. 13 is a perspective partially exploded view of a preferred embodiment of the apparatus useful in using our invention including a tester or patient (being diagnosed) input device 2100 operatively connected to a manual monitor/recorder 2110 which will indicate the sensory perception of the tester or individual being diagnosed. In place of the manual device 2100, a device known in the art for measuring brain wave patterns may be applied at this location (not shown). Thus, for example, such a device may be a PETT brain scan which, for example, shows in a normal person, symmetrical metabolism of $^{11}$C-2-deoxyglucose in the temporal lobes, a comparable metabolic rate in the frontal area and a considerable increased metabolic rate in the visual cortex as a result of stimulation resulting from the diagnosing gas. Such a scan is illustrated in the 1981 annual report of International Flavors & Fragrances Inc. published by Interntional Flavors & Fragrances Inc. in 1982. Said annual report is incorporated by reference herein.

The mass flow rate "Q" at location 2040 which is defined according to the equation:

$$\Sigma[F_x+A]=Q$$

wherein $F_x$ is defined according to the equation:

$$\Sigma[F_n+F_{Pn}]=F_x$$

may be further broken down because the density of the desorbing gasses "$F_1$", "$F_2$", "$F_3$", "$F_4$", "$F_5$", and the density of the functional fluid or diagnosing fluid or testing fluid "$F_{p1}$", "$F_{p2}$", "$F_{p3}$" et seq. are shown, respectively, by the symbols:

$\rho o$ and $\rho j$

The equations governing the mass flow rate of these fluids are shown thusly:

$$F_{nj}=\rho_o[T,P]\cdot S_{ni}\cdot u_{ni}$$

and $$F_{pnj}=\rho_i[T,P,s]\cdot S_{pnj}\cdot u_{pni}[u_{ni},F_{ni},D_{pnsi}]$$

If time is shown by the term:

$$\theta$$

then the reaction of the individual being diagnosed at location 2040 may be shown according to one or more of the following partial or total derivatives, to wit:

$$\frac{\partial F_{ni}}{\partial\theta};\ \frac{\partial F_{ni}}{\partial F_{pni}};\ \frac{\partial^2 F_{ni}}{\partial\theta\partial F_{pni}};$$

$$\frac{\partial F_{pni}}{\partial F_{ni}};\ \frac{d^2 F_{ni}}{d^2\theta};\ \frac{\partial^2 F_{pni}}{\partial F_{nii}\partial F_{nij}};$$

$$\frac{\partial F_{nii}}{\partial F_{nij}}$$

wherein "$F_{nii}$" is a flow of gas "$F_1$", "$F_2$", "$F_3$", "$F_4$", et seq. different from the flow of gas "$F_1$", "$F_2$", "$F_3$", "$F_4$", "$F_{nij}$". In the foregoing equation "$U_{ni}$" is the linear velocity of the stream "$F_1$", "$F_2$", "$F_3$", "$F_4$" et seq. and "$S_{ni}$" is the area of flow in the article of manufacture useful in conjunction with our invention 2025a, 2025b, 2025c, et seq.

The flow of olfactory sense testing fluid or diagnosing fluid or other functional fluid as shown by "$F_{p1}$", "$F_{p2}$", "$F_{p3}$", et seq. or in general "$F_{pni}$", is shown according to the equation:

$$F_{pnj}=\rho_i[T,P,s]\cdot S_{pnj}\cdot u_{pni}[u_{ni},F_{ni},_{pnsj}]$$

wherein "T" and "P" represent, respectively, temperature and pressure of the gas and wherein "s" represents the surface area of the polymeric particles having adsorbed therein a functional substance, e.g. 2026a, 2026b, 2026c et seq. and wherein "$D_{pnsi}$" represents the diffusivity of the functional fluid and/or diagnostic fluid and/or testing fluid in each of the particles in accordance with the nature of the polyepsilon caprolactone homopolymer taken alone or in admixture with other polymers or copolymers, e.g., polyethylene, for each of the sets of particles 2026a, 2026b, 2026c, et seq.

In general, the mass flow rate of the fluid in manifold 2016 is shown by the equation:

$$F=\rho^{Su}$$

where the symbol:

$$\rho$$

is the density of the fluid, "S" is the mean cross-sectional area of flow of the fluid and "u" is the linear velocity of the fluid. The flow of the fluid is further defined according to the differential equation:

$$\frac{\partial F}{\partial G}=Su\frac{\partial \rho}{\partial G}+\rho S\frac{\partial u}{\partial G}+\rho u\frac{\partial S}{\partial F}$$

where "G" represents any of the variables "$F_{ni}$", "$F_{pni}$", "$F_{nij}$", "$F_{nijp}$", "T", "P", "$\theta$" and the like. If "H" is a variable of flow different from "G", the mass flow rate is definable according to the equation:

$$\frac{\partial^2 F}{\partial G\partial H}=Su\frac{\partial^2 \rho}{\partial G\partial H}+\rho S\frac{\partial^2 u}{\partial G\partial H}+\rho u\frac{\partial^2 S}{\partial G\partial H}+\ldots$$

which is a generalized form of partial differential equation showing the interrelationship of all variables involved in the flow.

FIG. 14 is a schematic diagram of another embodiment of the apparatus shown in FIGS. 12 and 13 including an electronic program control system 2200 operative by association with the multiple manifold for controlling electronically the flow rates of air streams which evolve into flow rate "Q" which may be used (i) for testing the olfactory senses of prospective perfumers or flavorists; (ii) for devising and detecting novel fragrance formulations; (iii) for medical diagnoses whereby a patient is being diagnosed using an electronic program controller or computer such as, for example, using a PETT scan as illustrated in the International Flavors & Fragrances Inc. 1981 annual report.

Thus, the electronic program control system 2200 includes a programmer computer 2202, a sensory perception testing unit 2204 for testing different mixtures of substances, a patient testing unit or station 2206 whereat a patient may be diagnosed manually or by means of a light or wave means diagnosis device 2208. Furthermore, the patient may be diagnosed at 2206 electronically through a diagnosis olfactory sense feed-back device 2210 plugged into the programmer computer 2202.

More specifically, in the operation of the apparatus of FIG. 9, the patient, for example, at location 2040 or station 2206 senses air stream operating at flow rate "Q" which combines the streams entering cartridges 2025a, 2025b, 2025c, 2025d, 2025e . . . 2025g evolving from orifice 2012 and heated to various temperatures using heating means 2011 controlled by the control device 2011 operatively connected to a temperature sensor 2015a through control line 2013. The air streams "$F_1$", "$F_2$", "$F_3$" et seq. mix with the air stream "A" from blower 2042 through duct 2002. Gas stream "A" passes through nozzle 2008 past Venturi throat (which may be variable) 2010. In addition, the position of the Venturi throat 2010 may be varied and the diameter of the Venturi may be varied electronic programmer control lines 2008c and 2010c.

The diagnosis-olfactory sense feedback device 2210 is operatively connected to the electronic programmer 2202 via line 2210c. The tester or patient sense device 2202 which may be measuring brain waves and brain wave patterns is operatively connected with an electronic program controller device 2100 via control line 2202c. A sensory perception tester unit 2204 is operatively connected to the electronic program controller 2202 via line 2204a wherein intermittently or continuously the mixture of testing substances or olfactory sensing substances in article of manufacture 2025a, 2025b, 2025c, 2025d, 2025e . . . 2025g et seq. are varied through a control unit 2050 which is operatively connected to the program computer 2202 via line 2050c whereby variation of flow rate will depend upon the output of diagnosis sense feedback device 2210 or tester or patient sensory feedback device 2204 via control lines 2025ac, 2025bc, 2025cc, 2025dc, 2025ec, 2025fc, 2025gc and the like and through main control line 2017xc. In addition, the main flow rate "$F_x$" from manifold 2016 through orifices 2014a and 2014b may be controlled via optional control lines as well as an optional control line which controls the nozzle diameter by means of an electro-mechanical mechanism (not shown) plugged into the electronic program controller 2202.

The control unit 2050 controls the operation of heating unit 2011 and temperature sensor 2015a through lines 2011a and 2015b. An air power supply source 2052 is operatively connected to the programmer computer 2202 via line 2052c whereby air supply to air duct 2002 may be controlled electronically in accordance with the air flow required.

Optionally, the apparatus of FIG. 14 can also involve the use of light or other wave diagnosis devices 2208 plugged into the electronic program controller 2202 via control line 2208c. The involvement of detection of various wavelengths of light in conjunction with various olfactory perceptions by the individual at location 2040 can give rise to an even more accurate determination of physiological and/or neurological functions or malfunctions and therefore give rise to a more accurate diagnosis.

Another version of the olfactory testing and/or physiological malfunction diagnosing apparatus which uses the articles of manufacture of our invention is set forth in FIG. 15.

Now referring to FIG. 15, air at main air flow rate "A" is sucked into conduit 2303 by means of blower 2302 through screen 2301. The apparatus resting on table 2310 is either operated manually or via an electronic program controller involving patient 2315 at location 2340. The air at flow rate "A" blown using blower 2302 proceeds through duct 2340 and nozzle 2305 which may be varied using an electronic program controller plugged into a console or brain wave sensing device 2316. The air at flow rate "A" combines with functional fluid/aspirated air at flow rate "$F_x$" at Venturi throat 2307 of the Venturi 2306 which may be movably connected to conduit 2303. The air or other aspirating gas at flow rates "$F_1$", "$F_2$", "$F_3$", "$F_4$", et seq. proceeds through an article of manufacture useful in conjunction with our invention containing poly(epsilon caprolactone) homopolymers alone or in admixture with other polymers having functional and/or diagnosing and/or testing fluid adsorbed therein 2311*a*, 2311*b*, 2311*c*, 2311*d*, 2311*e*, et seq. into manifold unit 2312 which may be removed from the apparatus in order to quickley and conveniently replace cartridges 2311*a*, 2311*b*, 2311*c*, 2311*d* and 2311*e*, et seq. The manifold unit 2312 may be rotated about rotating cylinder 2309 in order for efficient removal manually or mechanically by either the individual being tested for physiological malfunctions or being olfactory tested at location 2340 or by a professional operator who is also monitoring the brain wave functions at another location behind console 2316 at location 2304.

An article useful in conjunction with mixtures of (i) functional fluid or solid containing poly(epsilon caprolactone) homopolymers taken together with (ii) functional fluid or solid containing polyethylene or polypropylene or polyethylene or polypropylene taken alone without functional fluid or solid comprises an ellipsoidally-shaped detergent tablet 231 containing a solid plastic core which is fabricated from a mixture of (i) poly(epsilon caprolactone) homopolymer taken further in combination with polyethylene or polypropylene taken further together with polyethylene or polypropylene which functional fluid or solid may be, for example, an aromatizing substance, e.g., a perfume material. The functional fluid or solid will be controllably transported from the plastic core into and through the soap cake over a reasonable period of time during the use of the soap cake. The control of the transport is further effectuated by means of the poly(epsilon caprolactone) homopolymer containing the functional fluid or solid as defined, supra. Further, polymers in addition to the poly(epsilon caprolactone) homopolymer can be polymers such as those described in U.S. Pat. No. 4,247,498 issued on Jan. 27, 1981 (the specification for which is incorporated by reference herein).

The weight ratio of the poly(epsilon caprolactone) homopolymer is defined, infra, and other polymer preferably varies between 40 parts by weight poly(epsilon caprolactone) homopolymer:60 parts by weight other polymer, e.g., polyethylene up to 60 parts by weight poly(epsilon caprolactone) homopolymer:40 parts by weight other polymer, e.g., polyethylene produced according to U.S. Pat. No. 4,366,298 issued on Dec. 28, 1982.

Surrounding the central plastic core containing functional fluid or functional solid such as perfume material 232, is detergent 230' which is in the solid phase at ambient condition, e.g., room temperature and atmospheric pressure. Examples of workable detergents 230' are "elastic" detergents such as those described in U.S. Pat. No. 4,181,632 issued on Jan. 1, 1980, the disclosure of which is incorporated by reference herein, or "transparent" soaps such as those set forth in U.S. Pat. No. 4,165,293 issued on Aug. 21, 1979, the disclosure of which is incorporated herein by reference. Examples of the detergent 230' useful in our invention are those set forth as "as variegated soaps" in Canadian Letters Patent No. 1,101,165 issued on May 19, 1981, the disclosure of which is incorporated by reference herein.

The detergent bar or tablet 230 of our invention may be of any geometric shape, for example, a rectangular parallelepiped tablet 230*a* is shown in FIGS. 20, 21 and 22 containing solid plastic core 239 (containing the poly(epsilon caprolactone) homopolymer taken in combination with other polymers). The functional fluid or solid e.g., aromatizing material located in solid plastic core 239 on use of the detergent bar passes through, at steady state, surface 237, detergent 238 and finally surface 239 at, for example, locations 240, 241, 242 and 243. The environment surrounding the detergent bar, on use thereof, is then aesthetically aromatized at 243, 244 and 245, for example, when the functional fluid is an aromatizing material.

As is shown in FIGS. 23, 24 and 25, the plastic core of the detergent tablet 230 may have a single finite void at its center 251 in which a functional fluid such as an aromatizing agent is contained. The plastic core then is a shell 248 having outer surface 252. The functional fluid or solid, e.g., aromatizing agent contained in the void in the plastic core permeates through the shell 248, past surface 252 at a steady state, through the detergent 247 and to the environment at, for example, 256, 257, 258 and 259.

In addition to the functional fluid or solid, e.g., aromatizing agent contained in the core, e.g., core 239 or core void 249, the core can also contain other materials for therapeutic use, for example, bacteriastats, deodorizing agents other than the original functional fluid or solid, e.g., aromatizing agent already contained in the core, and in addition, or in the alternative, insect repellents, shark repellents, animal repellents and the like.

In the alternative, the plastic core of the detergent tablet of FIGS. 23, 24 and 25 may have an empty single finite void at its center with the functional fluid, e.g., aromatizing agent contained in the shell 248.

At the end of the use of the detergent tablet, the hollow core or the solid core can be used as an aroma-imparting, air freshener or insect or animal repellent-type household article. In addition, depending upon the ratio of the volume of the void 251, the detergent tablet of FIGS. 23, 24 and 25 can be so fabricated that it will float on the surface of the liquid in which it is being used and this physical attribute has certain obvious advantages, e.g., as a "toy" or as a "marker" in a natural body of water.

FIGS. 26 and 27 set forth in block diagram form process flow sheets for preparing the detergent tablets within which are contained the cores fabricated from poly(epsilon caprolactone) homopolymers taken further in conjunction with other polymers, e.g., polyethylene or polypropylene or copolymers of polyurethanes and poly(epsilon caprolactones).

Thus, in FIG. 26, a perfume or "concentrate of perfume in polymer" 261 is combined with additional polymer 259 (which may be additional poly(epsilon caprolactone) or may be additional other polymer, e.g., polyethylene or copolymer) and the resulting mixture is molded into bars, ellipsoids, rectangular, parallelepipeds or spheres at 260. Soap is then cast around these molded polymer spheres, ellipsoids or rectangular parallelepipeds at 263 from a source of molten soap 262. The resultant castings are then cooled in order to form soap cakes in the solid phase at ambient conditions at 264.

In the alternative, polymer sheets 265 are imbedded with functional fluid, e.g., aromatizing agent from source 266 to form aromatized plastic sheets at 267. These aromatized plastic sheets are then cut at the cutting station 268 to form cut forms at 269 which are then heated to such a temperature whereby the angular sharp corners are "polished" at 272. Soap from molten soap source 270 is then cast around the resultant plastic forms at casting station 273 and the resultant material is then cooled thereby forming reinforced aromatized soap cakes at 274.

As will be seen in FIG. 28, pellets of polymer material which contain poly(epsilon caprolactone) homopolymer taken further together with other polymers, 286, are placed, for example, into cup-like portions 299*a* of platens 299 heated with heating element 300, 301, 302, 303, 304 and 305 which convey heat to surfaces 306. The platens 299 are moved together after the pellets 286 are placed therein squeezing them together and heating them so that they fuse into the plastic cores suitable for the production of the soap or detergent tablets useful in conjunction with the poly(epsilon caprolactone) homopolymer—polyethylene (or other polymer) mixed polymer—containing functional fluids or solids of our invention. The number of pellets 286 placed onto surfaces 306 and the pressure exerted by platens 299 causes the flow of plastic between pellets 286 whereby the functional fluid, e.g., scenting or aromatizing material does not escape substantially from the pellets fusing the processing into the core. This requires a high pressure of 100–5,000 atmospheres and the maintenance of a relatively low temperature for fusing; between 30° F. and 70° F., for example.

It is to be understood that the poly(epsilon caprolactone) homopolymers taken in combination with other polymers, e.g., polyolefins such as polyethylene or polypropylene useful in our invention may be augmented with any other polymers, for example, those capable of having interconnected micropores which contain functional fluid, e.g., aromatizing or scenting material such as all of those disclosed in U.S. Pat. No. 4,247,498 issued on Jan. 27, 1981, the disclosure of which is incorporated by reference herein. Thus, the fused cores 312 after compression of the pellets 286 so that they flow together at surfaces 307 are releasable from the platens at 309 and usable in the processes set forth infra. It is convenient to incorporate in the polymer solution forming pellets 286 a small amount of a mold releasing agent well known to be useful in such processes.

The thus fused core 312 as is shown in FIG. 32, may then be incorporated between two tablet portions of soap or detergent 313 and 314, the upper tablet being 313 and the lower tablet being 314. Voids 315 are provided in upper tablet 313 and lower tablet 314 whereby when they are placed onto core 312 simultaneously and whereby when they are fused together by means of application of an exterior source of heat, the core 312 will conveniently fit snugly between the upper tablet 313 and the lower tablet 314.

In the alternative, the cores 312 as is illustrated by FIG. 29, may be passed onto conveyor belt 334 into cups 336 on conveyor belt 335 through a distributing hopper 335'. Cups 336 are then filled from filler 338 with molten soap maintained at a fluid temperature by heater 400 at location 401. At location 402 the cores now located in the molten soap 337 are cooled using cold air or other cooling means 403. The thus-formed solid tablets 340 are dropped onto conveyor belts 405 and sent to an appropriate packaging operation.

FIGS. 34 and 35 show in perspective, other methods for forming cores 312. Thus, in FIG. 34 two flexible plastic sheets composed of poly(epsilon caprolactone) homopolymer taken further in combination with other polymers having thicknesses between 1 cm and 2 cm each and widths of between 3 cm and 50 cm are fed through rollers 318 and 319 after imparting functional fluid or solid (e.g., perfumant) either one or both sheets using rollers 514 and 515, for example. The functional fluid, e.g., perfume is fed onto the plastic sheets each of which or one of which has interconnected micropores through orifices 317 in the rollers 514 and 515. Thus, solutions at 316 under high pressure are fed through the orifices 317 onto plastic sheets 313 and 322 and into the plastic sheets through the interconnected micropores therein. The solutions of functional fluid or solid, e.g., perfume may be solutions in liquid ammonia or more preferably liquid carbon dioxide at temperatures where the structure of the poly(epsilon caprolactone) homopolymer—polyethylene (or other polymer) mixture—containing plastic sheets 313 (e.g., aromatized sheet) or sheets 313 and 322 are passed and 322 will not be physically impaired. The thus-treated sheet through rollers 318 and 319 where they are fused together using heating elements 321 subsequent to fusing, the thus formed sheet is cut using cutter 323 at location 324. The cut fused sheets are now in strips 325 which are heated at 327 by heating source 326 in order to eliminate any sharp edges thereby forming cores 312. Cores 312 are then passed onto conveyor belt 500 into cup 330 which is simultaneously filled from filler 331 with molten detergent 501 at such a rate and at such a temperature and having such a viscosity and density that the core 312 is caused to be retained at a location concentrically within the molten soap 332. The thus formed core-detergent article is cooled so that the detergent surrounding the core solidifies and is in such a state that it is released from the cut 333.

By the same token, a single plastic sheet 341 as is shown in FIG. 35 may be first heated by heating means 342 and then passed through rollers 343 and 344 which are hollow and which have orifices 345 at location 346. Perfuming or aromatizing or other functional fluid material is passed through the orifices 345 under pressure at location 346 into interconnected micropores 347. The sheet is cut at 350 using cutting means 349 and is then passed onto conveyor belt 352 operated by roller 353. The resulting cut plastic containing functional fluid, e.g., perfume 351 is heated to remove any sharp corners at location 354 by heating means 355.

The following examples are presented to more fully explain the present invention and are merely illustrative of the present invention and are not intended as a limitation upon the scope thereof. Unless otherwise indicated all parts and percentages are by weight.

EXAMPLE I

A poly(epsilon caprolactone) homopolymer—polypropylene 50:50 weight:weight mixture is formed by admixing poly caprolactone thermoplastic polymer PCL-700 (produced by Union Carbide Corporation of New York, N.Y. and having an average number of repeating monomeric units of 700) with polypropylene having an average molecular weight of 1000. The resulting mixture is fed to a reciprocating single screw extruder the design of which involves an interrupted screw type device which rotates and reciprocates simultaneously. A schematic diagram of this extruder is set forth in FIG. 2. The resin mixture at location 13 is placed in hopper 14 and fed to the extruder cylinder 16 powered by engine 15. Simultaneously, at location 23A the following perfume mixture is added to the extruder.

The temperature profile of the extruder is 195°–240° F. The feed rate range of resin is 120–130 pounds per hour (total). The feed rate range of perfume composition is 1–1.25 pounds per hour.

The extruded material is pelletized using a pelletizer as set forth in FIG. 3.

The resulting pellets are then placed in cups 309 as set forth in FIG. 30 and the pellets are then molded as shown in FIGS. 31 and 32 and used as a core for soap as shown in FIG. 33. The resulting soap on storage without being packaged has a perfume retention and evolution time of over 1 year.

EXAMPLE II

The following fragrance formulation is prepared:

| Ingredients | Parts by Weight |
|---|---|
| Beta phenyl ethyl alcohol | 12.2 |
| Trans, trans, delta damascone | 3.8 |
| Betadamascenone | 4.2 |
| Alpha phenyl ethyl alcohol | 4.3 |
| Geranium bourbon natural | 4.8 |
| Nerol oil | 4.2 |
| Vetiver Venezeula | 4.8 |
| Vetiver E.I. | 4.2 |
| Petigrain Paraguay | 4.8 |

34.44 Parts by weight of this fragrance composition is added to 99 parts by weight of polycaprolactone PCL-700 manufactured by the Union Carbide Corporation of New York, N.Y. The resulting mixture is shaken to distribute the fragrance composition evenly throughout the mixture. The resulting mixture is heated in an oven between 90°–95° C. until the mass is liquified entirely. The resulting mixture is stirred until the homogeneous liquid is obtained under a nitrogen atmosphere at 1.5 atmospheres pressure and then reheated 12 minutes. The resulting mixture is restirred and poured into molds and allowed to harden.

FIG. 1A shows the weight loss of the fragranced polymer over a period of 25 days when starting with 25% fragrance oil in the polymer produced according to the foregoing procedure. This data is as follows:

| Elapsed Days | Weight of Object | Weight Loss | Percent of Fragrance Loss |
|---|---|---|---|
| 0 | 29.87 | — | — |
| 4 | 28.82 | 1.05 | 14.0% |
| 8 | 28.17 | 1.70 | 22.8% |
| 11 | 27.86 | 2.01 | 26.9% |
| 14 | 27.58 | 2.29 | 30.7% |
| 18 | 27.27 | 2.60 | 34.9% |
| 21 | 27.10 | 2.77 | 37.1% |
| 25 | 26.88 | 2.99 | 40.1% |

The graph indicated by reference numeral "6" is the graph for percent weight loss over 25 day period for a poly(epsilon caprolactone) homopolymer starting with 10% by weight fragrance form using the above procedure:

| Elapsed Days | Weight of Object | Weight Loss | Percent of Fragrance Loss |
|---|---|---|---|
| 0 | 32.00 | — | — |
| 4 | 30.47 | 1.53 | 19.1 |
| 8 | 29.57 | 2.43 | 30.3 |
| 11 | 29.15 | 2.85 | 35.6 |
| 14 | 28.78 | 3.22 | 40.3 |
| 18 | 28.39 | 3.61 | 45.1 |
| 21 | 28.18 | 3.82 | 47.8 |
| 25 | 27.91 | 4.08 | 51.0 |

EXAMPLE III

The following fragrance formulation is prepared:

| Ingredients | Parts by Weight |
|---|---|
| American cedar oil | 200 |
| Patchouli oil | 50 |
| Vetiver oil | 30 |
| Bergamot oil | 150 |
| African geranium oil | 50 |
| Coumarin | 60 |
| Resinodour oak moss | 80 |
| Resinodour tolu | 200 |
| Resinodour labdanum | 150 |
| Musk xylene | 10 |
| Musk ambrette | 15 |

Scented poly(epsilon caprolactone) homopolymer pellets having a pronounced woody/patchouli scent are prepared as follows:

Poly(epsilon caprolactone) "PCL-700" manufactured by the Union Carbide Corporation of New York, N.Y. having a melting point of about 140°–160° F. are placed hopper 14 and fed into the extruder as shown in FIG. 2, a twin screw extruded manufactured by Welding Engineers Inc. (W. E. Twin Screw Compounder as set forth in Welding Engineers Bulletin 20-2, the disclosure of which is incorporated by reference herein) at a feed rate of 140 pounds per hour. The temperature of the extruder is operated at 200°–210° F. Simultaneously, the fragrance set forth above is fed from holding tank 17 through gear pump 23 into the extruder at location 23A. The feed rate is 2 pounds per hour.

The extrusion "rope" is pelletized using the apparatus of FIG. 3.

Poly(epsilon caprolactone) beads or pellets having pronounced patchouli scents are thus formed. Analysis demonstrates that the pellets contain about 25 percent of the patchouli formulation so that almost no losses in the scenting substance did occur. These pellets may be called master pellets.

Fifty pounds of the patchouli-containing master pellets are then added to one thousand pounds of an unscented 50:50 polyethylene:poly(epsilon caprolactone)

PCL-700 mixture and the resulting mixture of pellets is then compounded in a Baker Perkins MPC/V compounder (feed rate 120 pounds per hour; temperature profile 200°-225° F.). The resulting extruded material is molded into thin sheets of films. The thin sheets of films have pronounced patchouli aromas. The sheets of films are cut into strips 0.25 inches in width×3 inches in length and placed into apparatus illustrated in FIG. 12 (after being placed into articles as illustrated in FIGS. 8, 9 and 10). The strips are used in place of the beads in a cylinder as illustrated in FIGS. 8, 9 and 10.

On operation of said apparatus as a room air freshener, after four minutes the room has an aesthetically pleasing faint patchouli scent with no foul odor being present. The apparatus used has the following dimensions:

a. 20'×5" diameter air hose;
b. air flow rate: 60 cubic feet per minute;
c. inside effective diameter of outer opening 5 inches;
d. Venturi constriction: 50%;
e. weight of scented poly(epsilon caprolactone) homopolymer strips (per article): 3 ounces;
f. mass flow rate of air past article: 15 cubic feet per minute;
g. number of holes per article: 5
h. hole diameter: 0.1 inches
i. article height: 3 inches.

When the cut up strips are replaced by the "master pellets" having the same weight, a 15'×12'×15' room is aromatized in 12 seconds with a faint, pleasant patchouli scent using the above flow rate.

The aromatization of the room occurs in 6 seconds when the main air stream is heated to 60° C. using an electrical energy source.

What is claimed is:

1. A hollow, totally enclosed structure comprising a thin shell totally enclosing an inner void, said thin shell having a lower base and an upper base and a side wall portion, said side wall portion connecting said upper base and said lower base in a substantially continuous fashion, said side wall being substantially impermeable to gas, said upper base being permeable to gas passing therethrough and said lower base being permeable to gas passing therethrough, and contained within at least a major portion of said void, polymeric particles which consist essentially of polymer and a functional fluid, said functional fluid being selected from the group consisting or aromatizers, deodorizers, animal repellents, pheremones, insect repellents, insect attractants, materials capable of diagnosis of physiological and/or psychological aberrations or malfunctions of mammalian species and medicinal products, said functional fluid being capable of being volatilized in the presence of an air stream passing from said lower base to said upper base through said permeable upper base and lower base in a direction substantially parallel to said outer wall, said polymeric particles being produced by means of:

(a) forming a first flowable mass of poly(epsilon caprolactone) homopolymer having the structure:

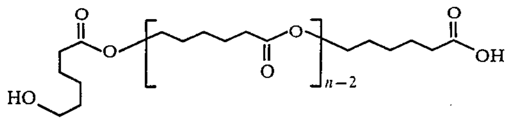

and from 0 up to minor proportion of the structure:

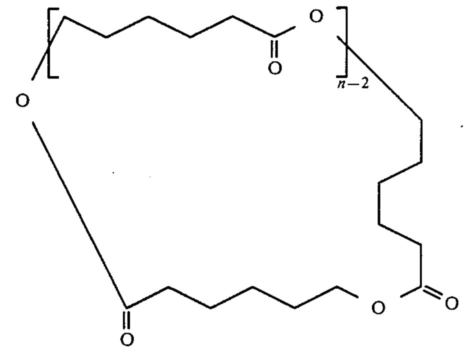

wherein n is an integer of from about 500 up to about 1,200 with a proviso that the average n in the system varies from about 600 up to about 800 with from about 1% up to about 30% by weight of said functional fluid;

(b) causing the flowable mass to be formed into an extruded rod using an extruder; and (c) pelletizing the thus formed extruded rod to form pellets in the solid state;

said poly(epsilon caprolactone) homopolymer containing a stabilizer.

2. The article of manufacture of claim 1 wherein the functional fluid is a perfumed substance and the perfumed substance is compatible with said poly(epsilon caprolactone) homopolymer.

3. The article of manufacture of claim 1 wherein the functional fluid is an animal repellent, the animal repellent is an aliphatic ketone, and the aliphatic ketone is compatible with said poly(epsilon caprolactone) homopolymer.

4. The article of manufacture of claim 1 wherein the functional fluid is a substance capable of diagnosis of physiological and/or psychological aberrations or malfunctions of mammalian species.

5. The article of manufacture of claim 3 wherein the ketone is an aliphatic or alicyclic ketone containing from about 6 up to about 20 carbon atoms.

6. The article of manufacture of claim 1 wherein the poly(epsilon caprolactone) is further admixed with polyethylene.

* * * * *